US011948394B2

(12) United States Patent
Shirasawa

(10) Patent No.: US 11,948,394 B2
(45) Date of Patent: Apr. 2, 2024

(54) DETECTION DEVICE

(71) Applicant: Japan Display Inc., Tokyo (JP)

(72) Inventor: Takuya Shirasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/075,921

(22) Filed: Dec. 6, 2022

(65) Prior Publication Data

US 2023/0186671 A1  Jun. 15, 2023

(30) Foreign Application Priority Data

Dec. 10, 2021 (JP) .................................. 2021-201199

(51) Int. Cl.
*G06V 40/13* (2022.01)
*G01L 1/22* (2006.01)
*G06V 40/12* (2022.01)
*G06V 40/50* (2022.01)

(52) U.S. Cl.
CPC ............ *G06V 40/1306* (2022.01); *G01L 1/22* (2013.01); *G06V 40/1365* (2022.01); *G06V 40/1382* (2022.01); *G06V 40/50* (2022.01)

(58) Field of Classification Search
None
See application file for complete search history.

(56) References Cited

U.S. PATENT DOCUMENTS

| 2018/0238748 | A1* | 8/2018 | Yang ................. G06V 40/1388 |
| 2020/0327293 | A1 | 10/2020 | Kurasawa et al. |
| 2021/0209336 | A1* | 7/2021 | Jonsson ............. G06F 18/2135 |
| 2022/0083761 | A1* | 3/2022 | Chen ..................... G06V 40/40 |

FOREIGN PATENT DOCUMENTS

JP  2017-134828 A  8/2017

* cited by examiner

*Primary Examiner* — Joseph R Haley
(74) *Attorney, Agent, or Firm* — K&L Gates LLP

(57) ABSTRACT

According to an aspect, a detection device includes a pattern detector, a force detector, and a controller. The controller is configured to store reference data in advance, acquire new data, and determine whether an object pressed against a contact surface when the new data is acquired is a human finger based on difference between acquisition target data indicated by the reference data at a plurality of timings and the acquisition target data indicated by the new data at a plurality of timings. The timings are two timings or more that are included in a pressing operation period from start to end of pressing of an external object against the contact surface, and the force detected by the force detector is different between the timings.

16 Claims, 17 Drawing Sheets

DETECTION DEVICE

CROSS-REFERENCE TO RELATED APPLICATION

This application claims the benefit of priority from Japanese Patent Application No. 2021-201199 filed on Dec. 10, 2021, the entire contents of which are incorporated herein by reference.

BACKGROUND

1. Technical Field

What is disclosed herein relates to a detection device.

2. Description of the Related Art

A method of performing human biometric authentication is known in which a fingerprint is read and collation is performed (refer to, for example, Japanese Patent Application Laid-open Publication No. 2017-134828).

In a classically known method of causing unauthorized authentication to be accepted falsely in fingerprint authentication, a model representing a human finger is produced of synthesis resin or gummy material and caused to be read by a fingerprint reading device. Thus, it has been requested to increase the accuracy of human-finger determination to prevent false acceptance of unauthorized authentication with such a model and allow correct acceptance of authentication only when a fingerprint read from a human finger matches a fingerprint registered in advance.

For the foregoing reasons, there is a need for a detection device that can increase the accuracy of human-finger determination.

SUMMARY

According to an aspect, a detection device includes: a pattern detector having a contact surface that allows an external object to make contact therewith and configured to detect a concavity and convexity pattern of a fingerprint when a human finger is pressed against the contact surface; a force detector configured to detect force applied to the contact surface; and a controller configured to perform user authentication processing based on the pattern detected by the pattern detector and the force detected by the force detector. The controller is configured to store in advance, reference data obtained by acquiring, at each of a plurality of timings when a human finger is pressed against the contact surface, acquisition target data including data related to the pattern detected by the pattern detector, data related to the force detected by the force detector, or both data, acquire new data including the acquisition target data acquired at each of a plurality of timings when an external object is newly pressed against the contact surface, and determine whether the object pressed against the contact surface when the new data is acquired is a human finger based on difference between the acquisition target data indicated by the reference data at the timings and the acquisition target data indicated by the new data at the timings. The timings are two timings or more that are included in a pressing operation period from start to end of pressing of an external object against the contact surface, and the force detected by the force detector is different between the timings.

DETAILED DESCRIPTION

Embodiments of the present disclosure will be described below with reference to the accompanying drawings. What is disclosed herein is merely exemplary, and any modification that could be easily thought of by the skilled person in the art as appropriate without departing from the gist of the invention is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

In this disclosure, when an element is described as being "on" another element, the element can be directly on the other element, or there can be one or more elements between the element and the other element.

Figure 1:
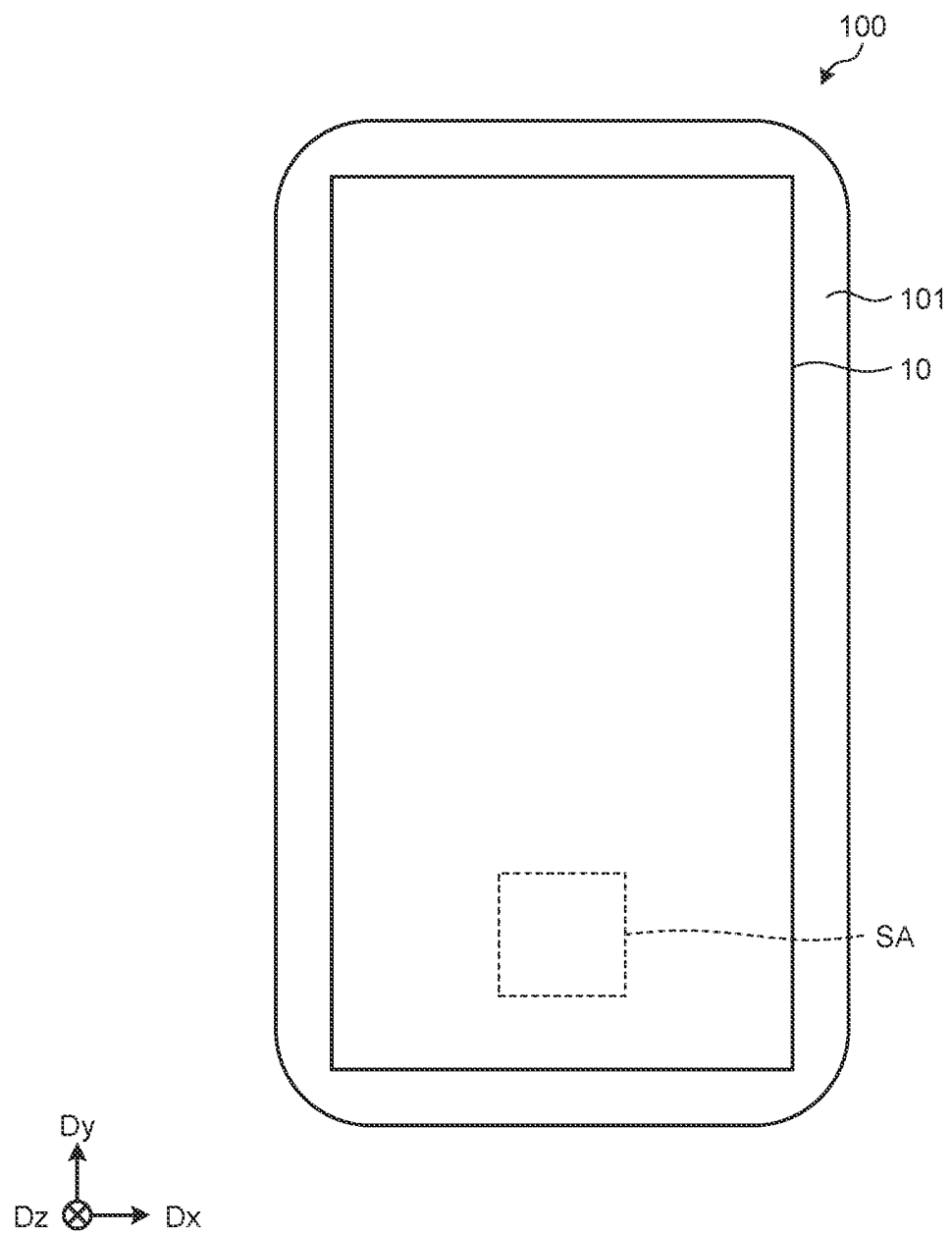
FIG. 1 is a schematic diagram illustrating an exemplary device provided with a detection device according to an embodiment.

FIG. 1 is a schematic diagram illustrating an exemplary device 100 provided with a detection device 10 according to an embodiment. The device 100 is a portable device such as a smartphone but not limited thereto. A device provided with the detection device 10 only needs to be a device in which the detection device 10 can be provided so that a human finger F (refer to FIG. 2) can contact the detection device 10. Such a device may be, for example, a fixed display device.

As illustrated in FIG. 1, the device 100 includes a housing 101 and the detection device 10. The detection device 10 performs touch detection and force detection at least in a detection region SA. The touch detection is detection of contact of an external object with a contact surface 31 (refer to FIG. 2) that allows an external object to make contact with the contact surface 31. The force detection is detection of force applied to the contact surface 31 by an external object.

In the following description, a first direction Dx is defined as a direction along one of two sides orthogonal to each other among four sides of the detection region SA having a rectangular shape, and a second direction Dy is defined as a direction along the other side. A third direction Dz is defined as a direction orthogonal to both the first direction Dx and the second direction Dy. A plan view means a front view of a plane orthogonal to the third direction Dz.

Figure 2:
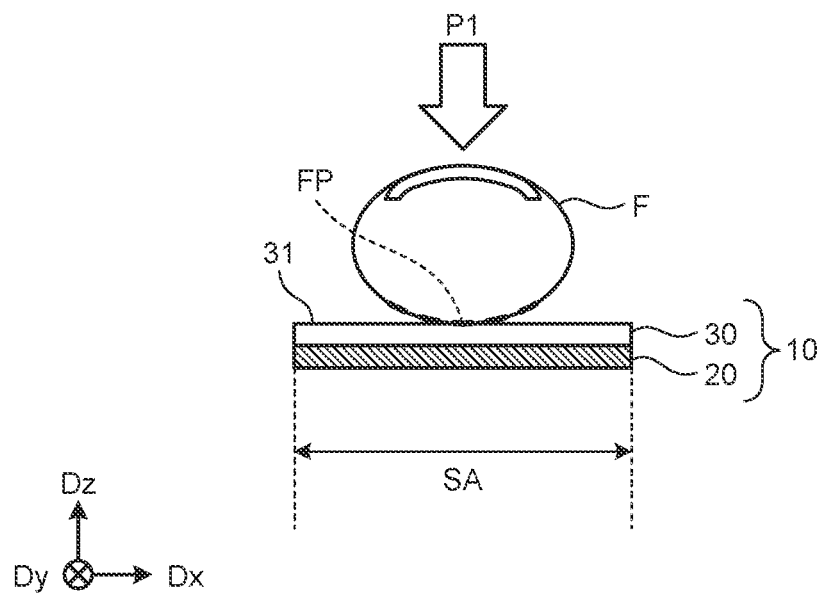
FIG. 2 is a schematic diagram illustrating an exemplary main configuration of the detection device and a state in which a finger contacts the detection device.

FIG. 2 is a schematic diagram illustrating an exemplary main configuration of the detection device 10 and a state in which the finger F contacts the detection device 10. As illustrated in FIG. 2, the detection device 10 includes a pattern detector 20 and a force detector 30.

The pattern detector 20 performs touch detection. In the embodiment, the pattern detector 20 reads a fingerprint FP of the finger F with a touch detection function. The pattern detector 20 according to the embodiment is positioned on the back surface side of the force detector 30. Details of reading of the fingerprint FP will be described later.

The force detector 30 performs force detection. The contact surface 31 of the pattern detector 20 is exposed outside the device 100. Thus, a user can contact and press the contact surface 31 with the finger F from the outside. The force detector 30 detects force applied to the detection device 10 by the finger F contacting the contact surface 31. FIG. 2 illustrates the force with an arrow P1. In the example illustrated in FIG. 2, the finger F is pressed against the contact surface 31 by force with which the finger F hardly deforms.

Figure 3:
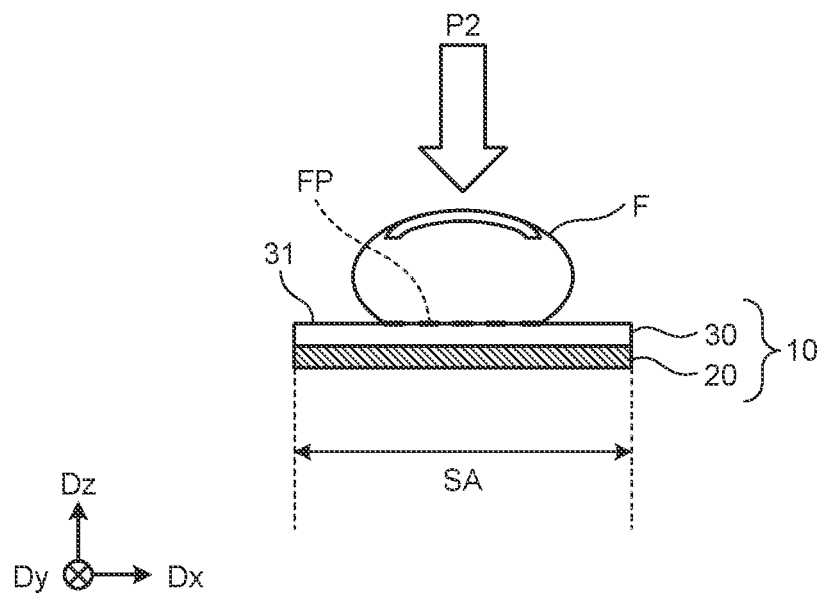
FIG. 3 is a schematic diagram illustrating the detection device in a state in which the finger applies force stronger than that in FIG. 2.

FIG. 3 is a schematic diagram illustrating the detection device 10 in a state in which the finger F applies force stronger than that in FIG. 2. FIG. 3 illustrates the stronger force with an arrow P2. In FIG. 3, the finger F is pressed against the contact surface 31 by force with which the fingerprint FP side of the finger F deforms in a flat shape along the plate surface of the contact surface 31. Thus, in FIG. 3, a wider area of the fingerprint FP contacts the contact surface 31 than in FIG. 2.

As described above with reference to FIGS. 2 and 3, the area of the fingerprint FP read by the pattern detector 20 and the magnitude of force detected by the force detector 30 change in accordance with the magnitude of force applied to the detection device 10 by the finger F. The detection device 10 has a function to perform user authentication based on a combination of the area of the fingerprint FP read by the pattern detector 20 and the magnitude of force detected by the force detector 30.

In FIGS. 2 and 3, the pattern detector 20 and the force detector 30 are included in the detection region SA, but the pattern detector 20 and the force detector 30 may extend out of the detection region SA. For example, the pattern detector 20 may be integrated with the display panel configured to display an image in the device 100. The force detector 30 may be restricted to being inside the detection region SA or may be provided outside the detection region SA.

The following describes various functions related to user authentication. First, an exemplary mechanism that the pattern detector 20 reads the fingerprint FP will be described below with reference to FIG. 4.

Figure 4:
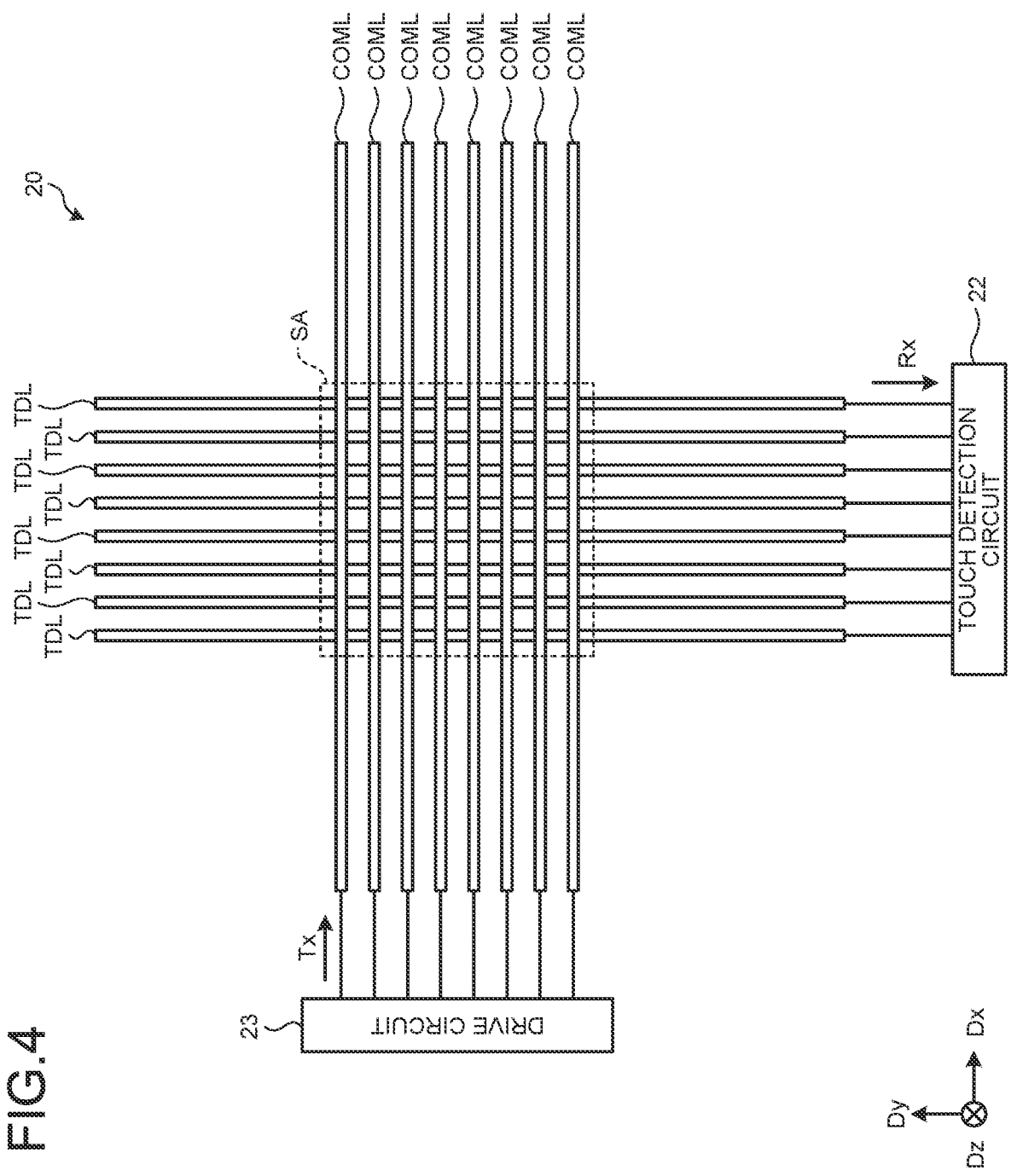
FIG. 4 is a schematic diagram illustrating an exemplary configuration of a pattern detector.

FIG. 4 is a schematic diagram illustrating an exemplary configuration of the pattern detector 20. As illustrated in FIG. 4, for example, the pattern detector 20 includes a plurality of drive electrodes COML, a plurality of touch detection electrodes TDL, a drive circuit 23, and a touch detection circuit 22.

Each drive electrode COML has a longitudinal direction along one direction (for example, the first direction Dx). The drive electrodes COML are arranged at intervals in a direction (for example, the second direction Dy) orthogonal to the longitudinal direction of each drive electrode COML.

Each touch detection electrode TDL has a longitudinal direction along one direction (for example, the second direction Dy). The longitudinal direction of each touch detection electrode TDL is orthogonal to the longitudinal direction of each drive electrode COML. The touch detection electrodes TDL are arranged at intervals in a direction (for example, the first direction Dx) orthogonal to the longitudinal direction of each touch detection electrode TDL.

The drive electrodes COML face the touch detection electrodes TDL with a gap interposed therebetween in the third direction Dz. Specifically, the drive electrodes COML are disposed opposite the touch detection electrodes TDL with an insulator such as a glass substrate interposed therebetween. When what is called an in-cell scheme in which the drive electrodes COML and the touch detection electrodes TDL are integrated with a display device is employed, a component related to display, such as a liquid crystal layer, is interposed between the drive electrodes COML and the touch detection electrodes TDL. The drive electrodes COML intersect the touch detection electrodes TDL in plan view. As illustrated in FIG. 4, the detection region SA includes a plurality of intersection positions between the drive electrodes COML and the touch detection electrodes TDL. The intersection positions are arranged in a matrix of rows and columns in the first direction Dx and the second direction Dy.

The drive circuit 23 provides a drive signal Tx to the drive electrodes COML at different timings, respectively. Specifically, the drive circuit 23 provides the drive signal Tx, for example, in a sequentially scanned manner from a drive electrode COML disposed on one end side in the second direction Dy among the drive electrodes COML toward a drive electrode COML disposed on the other end side. Capacitance is generated between each drive electrode COML and each touch detection electrodes TDL in accordance with provision of the drive signal Tx.

The touch detection circuit 22 detects, as a touch detection signal Rx, current flowing through the touch detection electrodes TDL in accordance with the capacitance generated between each drive electrode COML and each touch detection electrode TDL. The signal strength of the touch detection signal Rx changes in accordance with the degree of proximity to and contact with the contact surface 31 by an external object. Thus, the pattern detector 20 can perform touch detection based on the signal strength of the touch detection signal Rx detected by the touch detection circuit 22. Since the intersection positions between the drive electrodes COML and the touch detection electrodes TDL are disposed in a matrix of rows and columns in plan view as illustrated in FIG. 4, the pattern detector 20 can use each intersection position as a touch detection point and perform two-dimensional touch detection at a resolution corresponding to the number of intersection positions arranged in the first direction Dx and the second direction Dy.

The above description with reference to FIG. 4 is made on the exemplary configuration for performing touch detection in what is called a mutual capacitance scheme using the capacitance generated between each drive electrode COML and each touch detection electrode TDL. A specific mechanism of touch detection by the pattern detector 20 is not limited thereto. For example, what is called a self-capacitance scheme in which the self-capacitance of each of a plurality of electrodes disposed in a matrix of rows and columns is individually detected may be employed as a scheme of touch detection by the pattern detector 20. In any scheme, the pattern detector 20 functions as a concavity and convexity pattern detection sensor configured to detect concavities and convexities on an external object contacting the contact surface 31. The number of drive electrodes COML and the number of touch detection electrodes TDL illustrated in FIG. 4 do not necessarily correspond to the number of actually provided drive electrodes COML and the number of actually provided touch detection electrodes TDL. The number of drive electrodes COML and the number of touch detection electrodes TDL can be freely set.

Figure 5:
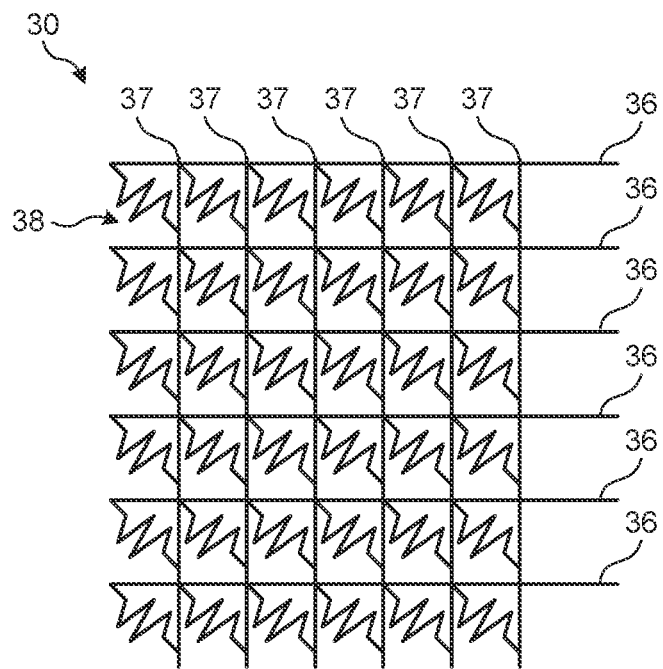
FIG. 5 is a schematic diagram illustrating an exemplary configuration of a force detector.
Figure 6:
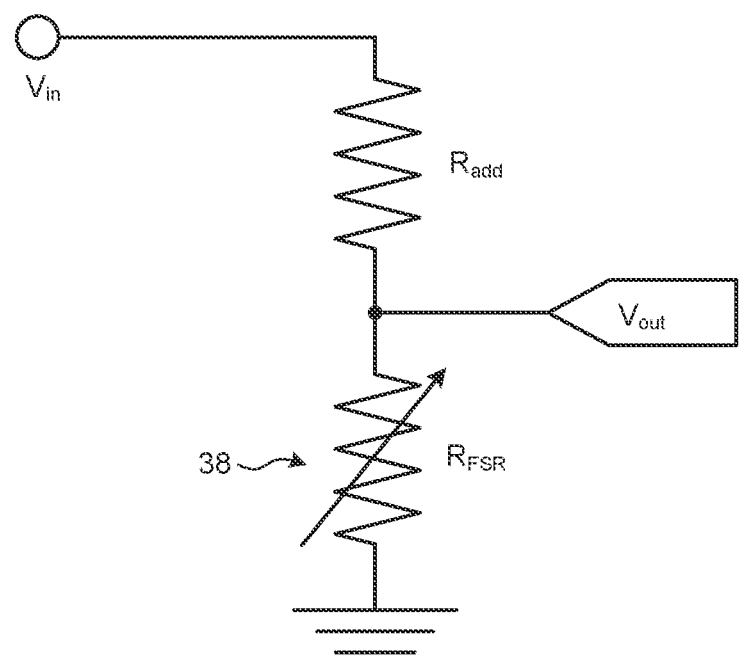
FIG. 6 is a diagram illustrating a circuit configuration of the force detector.

The following describes an exemplary mechanism that the force detector 30 detects force from the finger F with reference to FIGS. 5 and 6.

FIG. 5 is a schematic diagram illustrating an exemplary configuration of the force detector 30. Exemplary configurations of the force detector 30 include a configuration in which pressure-sensitive resistors are disposed in a two-dimensional matrix to enable force sensing at each position. A more specific example is a pressure-sensitive force sensing array as disclosed in the patent literature of Japanese Patent Application Laid-open Publication No. 2018-100907. Such a pressure-sensitive sensor has a configuration (passive matrix structure) in which a plurality of row electrodes 36 are provided on one of two flexible film base members, a plurality of column electrodes 37 are provided on the other flexible film base member, and the row electrodes 36 intersect the column electrodes 37 in plan view. A conductive layer 38 is provided between the two film base members. When force in such a direction that the gap between the two film base members decreases is applied to at least one of the two film base members, a resistance value between a row electrode 36 and a column electrode 37 at a position where the force is applied changes. In-plane distribution of the applied force can be measured by sensing the change of the resistance value.

FIG. 6 is a diagram illustrating a circuit configuration of the force detector 30. The pressure-sensitive sensor illustrated in FIG. 5 forms a voltage-dividing circuit including the conductive layer 38 as a variable resistor. An output Vout of the voltage-dividing circuit illustrated in FIG. 6 can be expressed as Expression (1) below. $V_{in}$ is, for example, five volts (V) but not limited thereto and is changeable as appropriate.

$$V_{out} = \frac{R_{FSR}}{R_{FSR} + R_{add}} \cdot V_{in} \quad (1)$$

A specific configuration of a force sensor included in the force detector 30 is not limited to that described above with reference to FIGS. 5 and 6 but is changeable as appropriate.

The resolution of touch detection by the pattern detector 20 may be the same as or different from the resolution of a force distribution detected by the force detector 30. The following describes an exemplary configuration when the resolution of touch detection by the pattern detector 20 is higher than the resolution of a force distribution detected by the force detector 30 with reference to FIG. 7.

Figure 7:
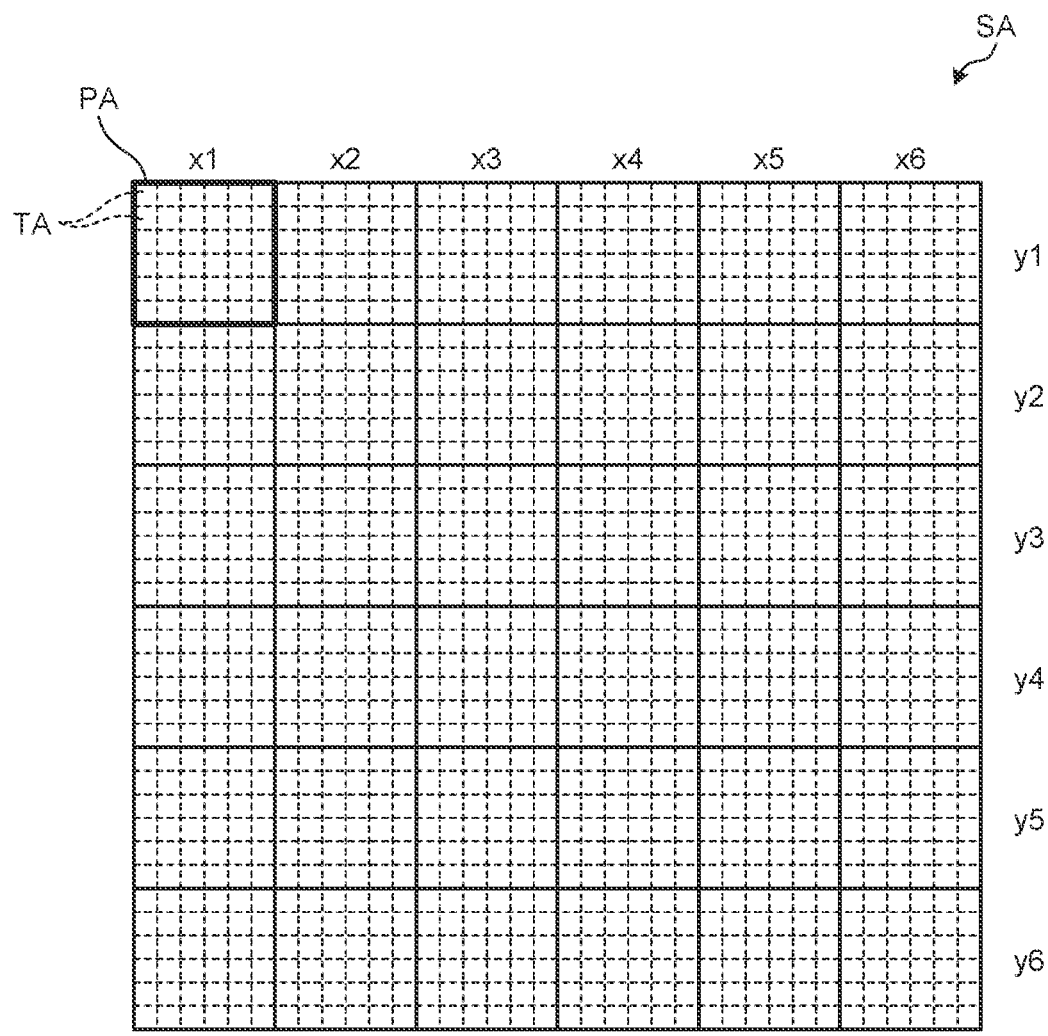
FIG. 7 is a plan view illustrating an exemplary configuration when the resolution of touch detection by the pattern detector is higher than the resolution of a force distribution detected by the force detector.

FIG. 7 is a plan view illustrating the exemplary configuration when the resolution of touch detection by the pattern detector 20 is higher than the resolution of a force distribution detected by the force detector 30. A case is assumed in which a partial region PA is the region of force detection by one force sensor. In this case, the region of force detection by a plurality of force sensors arranged in a matrix of rows and columns with m force sensors in the first direction Dx and n force sensors in the second direction Dy has a resolution of m×n. The numbers m and n are natural numbers. Coordinates that are set to individually identify the regions of force detection by the force sensors are combinations of coordinates x1, . . . , xm (x coordinates) provided in the first direction Dx and coordinates y1, . . . , yn (y coordinates) provided in the second direction Dy. In the configuration illustrated in FIG. 7, m and n are both six. In FIG. 7, only a solid-line rectangle at (x, y)=(1, 1) is denoted by the reference sign PA, but in reality, the minimum regions of 6×6=36 solid-line rectangles in FIG. 7 are the partial regions PA of different force sensors, respectively.

In FIG. 7, 6×6 touch detection areas TA partitioned with dashed lines are disposed in each partial region PA. Each touch detection area TA is provided to be able to individually acquire the touch detection signal Rx. Thus, when the pattern detector 20 has the specific configuration described above with reference to FIG. 4, the drive electrodes COML and the touch detection electrodes TDL are provided such that the intersection positions between the drive electrodes COML and the touch detection electrodes TDL correspond to the positions of the touch detection areas TA.

Although FIG. 7 illustrates an example in which the resolution of touch detection by the touch detection areas TA is 36 times higher than the resolution of a force distribution detected by the force detector 30, the ratio between the resolution of touch detection by the touch detection areas TA and the resolution of a force distribution detected by the force detector 30 can be freely set. For example, when each partial region PA has a size of 5 mm×5 mm in plan view, the granularity of the resolution of touch detection by the touch detection areas TA may be determined in the range of 50 μm (resolution 100 times higher than that of the partial region PA) to 5 mm (same as that of the partial region PA) in the first direction Dx and the second direction Dy.

The touch detection circuit 22 outputs touch detection data corresponding to the resolution of touch detection. The touch detection data is two-dimensional data in the first direction Dx and the second direction Dy, indicating the existence of contact on the contact surface 31 with binary values. The two-dimensional data can be regarded as what is called binary image data. Thus, when the fingerprint FP is read by the pattern detector 20, the binary image data can be regarded as fingerprint image data. Specifically, among concavities and convexities included in the fingerprint FP, recesses (concavities) do not contact the contact surface 31 and protrusions (convexities) contact the contact surface 31, whereby the pattern detector 20 obtains, as the touch detection data, data including a fingerprint image indicating the concavity and convexity pattern and two-dimensional pattern of the fingerprint. A force detection circuit 32 outputs force detection data corresponding to the resolution of a force distribution. The force detection data is two-dimensional data in the first direction Dx and the second direction Dy, indicating the magnitude of force detected in the partial region PA at each coordinate. The two-dimensional data can be regarded as image data having gradation corresponding to a force magnitude resolution with which each partial region PA is identifiable.

The detection device 10 has a function (falsification determination function) to hamper false acceptance of fake authentication with a finger model, in addition to a user authentication processing function based on the fingerprint FP. The finger model represents the human finger F and is made of a synthesis resin such as silicon rubber or a gummy material (gelatin). Hereinafter, a silicon finger model means a finger model made of silicon rubber. In addition, a gummy material finger model means a finger model made of a gummy material. The falsification determination function includes first authentication processing, second authentication processing, and third authentication processing. The following sequentially describes falsification determination processing. First, matters related to the first authentication processing will be described below with reference to FIGS. 8 to 11.

Figure 8:
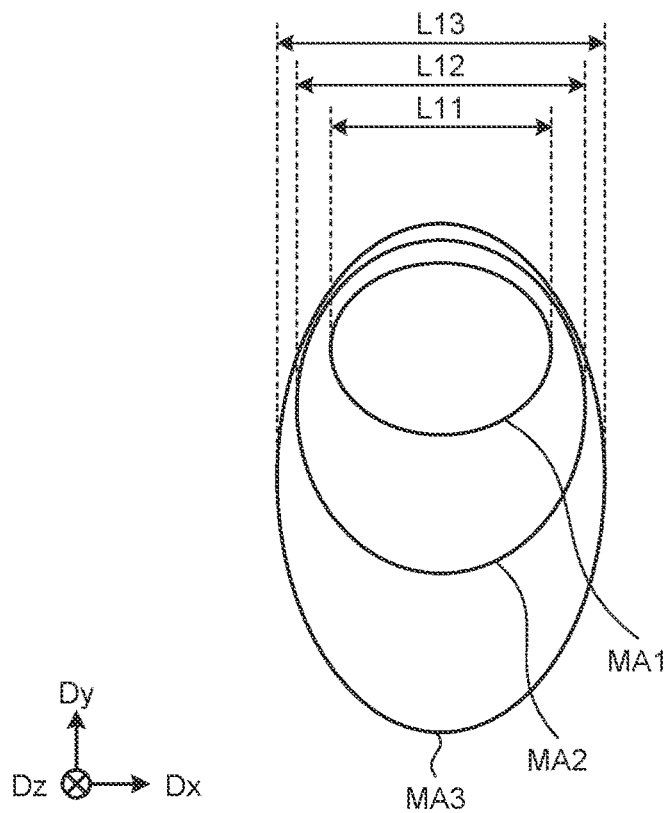
FIG. 8 is a schematic diagram illustrating the relation of contact regions MA1, MA2, and MA3 where a contact surface and a finger are in contact with each other with the dimensions of the contact regions MA1, MA2, and MA3 in a first direction.

FIG. 8 is a schematic diagram illustrating the relation of contact regions MA1, MA2, and MA3 where the contact surface 31 and the finger F are in contact with each other with the dimensions of the contact regions MA1, MA2, and MA3 in the first direction Dx. As described above with reference to FIGS. 2 and 3, the size of a contact region between the finger F and the contact surface 31 gradually increases as force applied to the detection device 10 by the finger F increases with the elapse of time since the start of contact between the finger F and the contact surface 31. Thus, with the elapse of time, the size of the contact region of the contact surface 31 and the finger F changes, for example, in the order of the contact regions MA1, MA2, and MA3 illustrated in FIG. 8. In the present disclosure, a "contact region" denotes an entire region where a finger and the contact surface 31 are in contact with each other, which includes a non-contact portion caused by concavities and the convexities of a fingerprint. Thus a "contact region" is a region including both a contact portion and a non-contact portion caused by concavities and convexities of a fingerprint (refer to FIG.

The dimension of the contact region of the contact surface 31 and the finger F in the first direction Dx is referred to as a first dimension (finger width direction dimension). As illustrated with the contact regions MA1, MA2, and MA3 between the contact surface 31 and the finger F in FIG. 8, the first dimension increases as the size of the contact region increases. FIG. 8 illustrates a dimension L11 of the contact region MA1, a dimension L12 of the contact region MA2, and a dimension L13 of the contact region MA3. The dimension L13 is larger than the dimensions L11 and L12. The dimension L12 is larger than the dimension L11.

Figure 9:
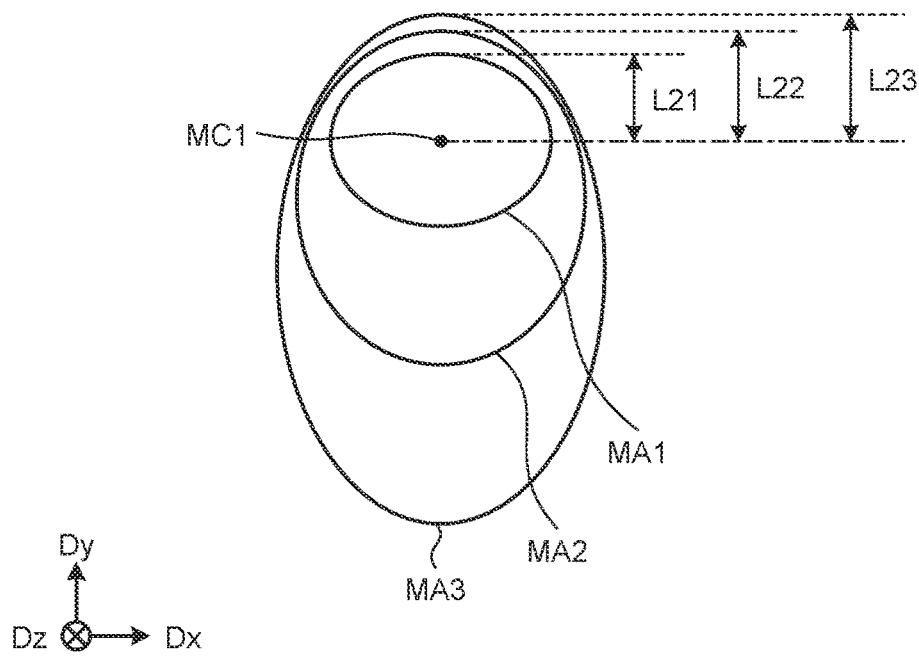
FIG. 9 is a schematic diagram illustrating dimensions indicated by a first end and a second end, the first end denoting the middle point of the dimension of the contact region MA1 in a second direction and the second end denoting one end of each contact region in the second direction.
Figure 10:
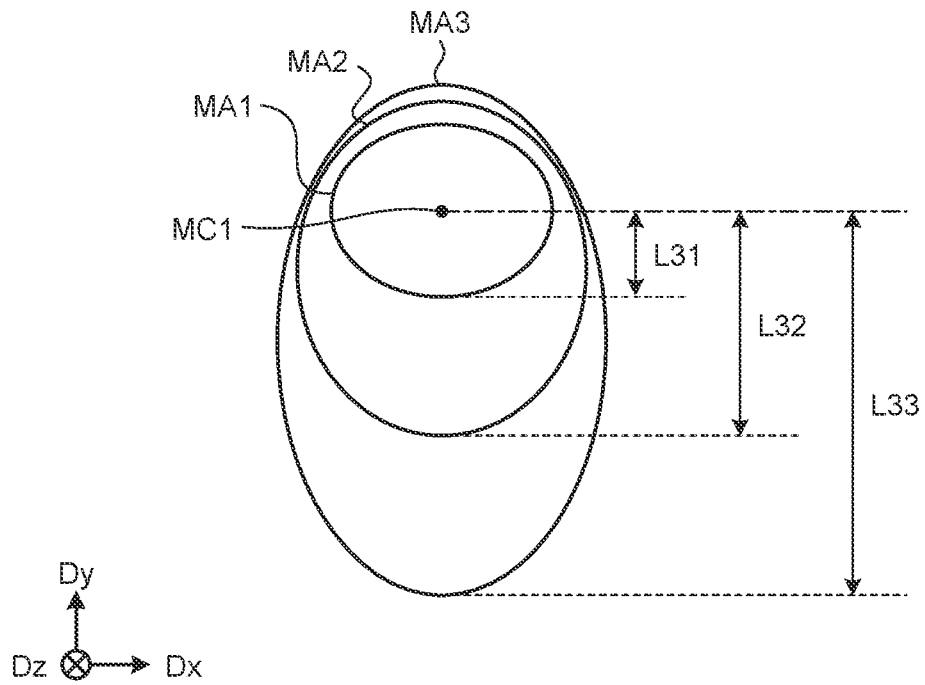
FIG. 10 is a schematic diagram illustrating dimensions indicated by the first end and a third end, the first end denoting the middle point of the dimension of the contact region MA1 in the second direction and the third end denoting the other end of each contact region in the second direction.

FIG. 9 is a schematic diagram illustrating dimensions L21, L22, and L23 indicated by a first end and a second end, the first end denoting a middle point MC1 of the dimension of the contact region MA1 in the second direction Dy and the second end denoting one end of each of the contact regions MA1, MA2, and MA3 in the second direction Dy. FIG. 10 is a schematic diagram illustrating dimensions L31, L32, and L33 indicated by the first end and a third end, the first end denoting the middle point MC1 of the dimension of the contact region MA1 in the second direction Dy and the third end denoting the other end of each of the contact regions MA1, MA2, and MA3 in the second direction Dy.

As illustrated with the contact regions MA1, MA2, and MA3 in FIGS. 8 to 10, the dimension in the second direction Dy of the contact region where the contact surface 31 and the finger F are in contact with each other increases as the size thereof increases. The middle point MC1 of the dimension of the contact region MA1 in the second direction Dy is referred to as a reference (first end). The dimension between the reference and one end (second end) of the contact region between the contact surface 31 and the finger F in the second direction Dy is referred to as a second dimension. The dimension L21 of the contact region MA1, the dimension L22 of the contact region MA2, and the dimension L23 of the contact region MA3 illustrated in FIG. 9 each correspond to the second dimension. The dimension L23 is larger than the dimensions L21 and L22. The dimension L22 is larger than the dimension L21. The dimension between the reference and the other end (third end) of the contact region between the contact surface 31 and the finger F in the second direction Dy is referred to as a third dimension. The dimension L31 of the contact region MA1, the dimension L32 of the contact region MA2, and the dimension L33 of the contact region MA3 illustrated in FIG. 10 each correspond to the third dimension. The dimension L33 is larger than the dimensions L31 and L32. The dimension L32 is larger than the dimension L31.

As illustrated in comparison between FIGS. 9 and 10, the degree of change of the second dimension with expansion of the contact region where the contact surface 31 and the finger F are in contact with each other is different from the degree of change of the third dimension with expansion of the contact region where the contact surface 31 and the finger F are in contact with each other. In comparison between FIGS. 9 and 10, the degree of change of the third dimension from the dimension L31 through the dimension L32 to the dimension L33 is more significant than the degree of change of the second dimension from the dimension L21 through the dimension L22 to the dimension L23.

Typically, the second dimension is a dimension (fingertip direction dimension) in the direction from the middle point MC1 toward the distal end of the finger F. The third dimension is a dimension (finger-base direction dimension) in the direction from the middle point MC1 toward the base of the finger F.

The degree of change of the first dimension (refer to FIG. 8) along with expansion of the contact region between the contact surface 31 and the finger F, the degree of change of the second dimension (refer to FIG. 9) along with expansion of the contact region between the contact surface 31 and the finger F, and the degree of change of the third dimension (refer to FIG. 10) along with expansion of the contact region between the contact surface 31 and the finger F are different from one another.

Figure 11:
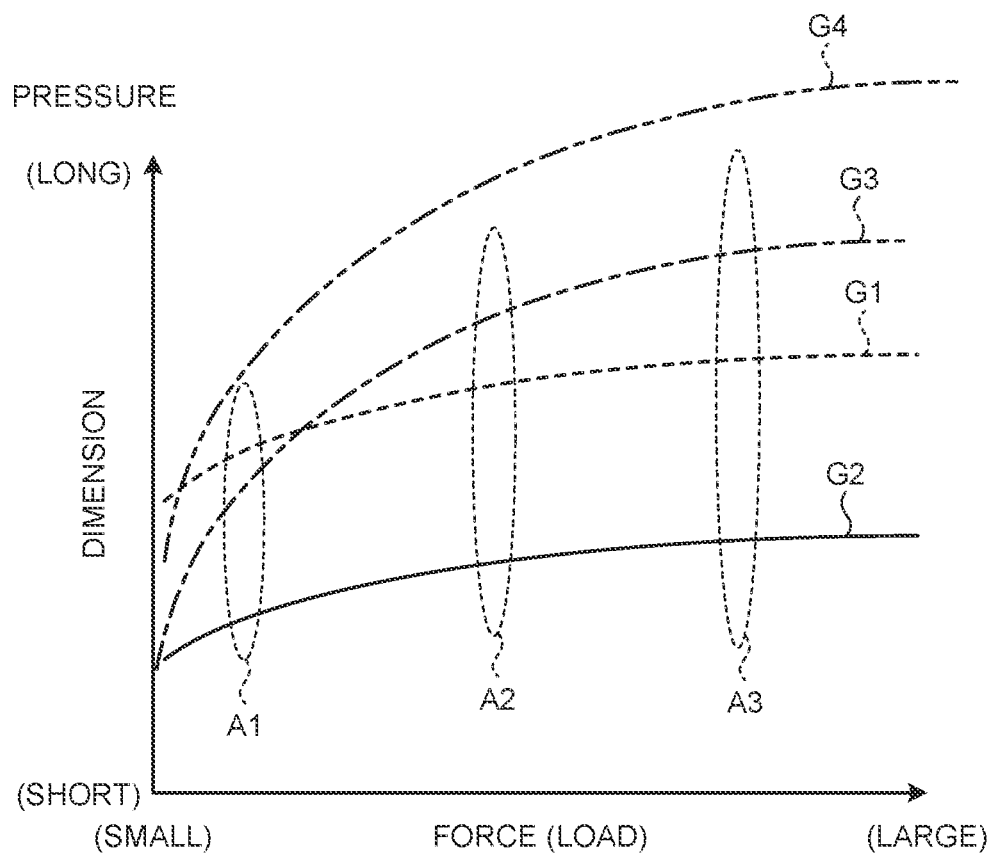
FIG. 11 is a graph illustrating the relation between the magnitude of force applied to the detection device by a finger, each of a first dimension, a second dimension, and a third dimension, and the dimension of a finger model in the first direction.

FIG. 11 is a graph illustrating the relation between the magnitude of force applied to the detection device 10 by the finger F, each of the first dimension, the second dimension, and the third dimension, and the dimension of a finger model in the first direction Dx. A graph G1 illustrates the relation between the magnitude of force applied to the detection device 10 by the finger F and the first dimension. A graph G2 illustrates the relation between the magnitude of force applied to the detection device 10 by the finger F and the second dimension. A graph G3 illustrates the relation between the magnitude of force applied to the detection device 10 by the finger F and the third dimension. A graph G4 illustrates the relation between the magnitude of force applied to the detection device 10 by the finger F and the dimension of the finger model in the first direction Dx.

The contact region MA1 illustrated in FIGS. 8 to 10 is obtained when a force of substantially A1 is applied. The contact region MA2 is obtained when a force of substantially A2 is applied. The contact region MA3 is obtained when a force of substantially A3 is applied. In the present disclosure, "a force of substantially A1" denotes a force equal to or close to A1. Similarly, "a force of substantially A2" denotes a force equal to or close to A2, and "a force of substantially A3" denotes a force equal to or close to A3.

Although there is individual difference between users, forces when the contact regions MA1, MA2, and MA3 are obtained rarely deviates extremely from forces of A1, A2, and A3, respectively. Thus, in the embodiment, a first force corresponding to a force of A1, a second force corresponding to a force of A2, and a third force corresponding to a force of A3 are predetermined. In the embodiment, the first authentication processing, the second authentication processing, and the third authentication processing are performed based on the touch detection data and the force detection data obtained at timings when the first force, the second force, and the third force determined in this manner are detected by the force detector 30.

As illustrated with the graphs G1, G2, and G3 in FIG. 11, the first dimension of the contact region MA1 obtained when a force of substantially A1 is applied is larger than the second dimension and the third dimension thereof. Since the middle point MC1 is the middle point of the contact region MA1 in the second direction Dy as described above, the second dimension and the third dimension of the contact region MA1 are equal to each other. The third dimension of the contact region MA2 obtained when a force of substantially A2 is applied, is larger than the first dimension and the second dimension thereof. The second dimension of the contact region MA2 obtained when a force of substantially A2 is applied, is smaller than the first dimension thereof. The relative magnitude relation between the first dimension, the second dimension, and the third dimension of the contact region MA3 obtained when a force of substantially A3 is applied, is the same as that of the contact region MA2 obtained when a force of substantially A2 is applied.

However, the pattern of change of the contact region between the contact surface 31 and the finger model with change of force applied by the finger model is different from that of the contact region between the contact surface 31 and the finger F. For example, as illustrated with the graph G4 in FIG. 11, the dimension of the finger model in the first direction Dx is significantly larger than the first dimension of the finger F illustrated with the graph G1. Such dimension difference occurs due to difference between the finger model and the finger F, such as difficulty in reproduction of elasticity of the finger F with the finger model. Although the dimension of the finger model in the first direction Dx is exemplified in FIG. 11, the relation between dimension change in the second direction Dy and dimension change in the first direction Dx with change of force applied by the finger model tends to be partially or entirely different from that with change of force applied by the finger F.

The detection device 10 performs, as the first authentication processing described above, processing of determining whether an object pressed against the contact surface 31 is the finger F based on the relation between change of the magnitude of force applied to the detection device 10 by the finger F and each of the first dimension, the second dimension, and the third dimension described above with reference to FIGS. 8 to 11. For example, when the first dimension, the second dimension, and the third dimension change with change of the magnitude of force applied to the detection device 10 as illustrated with the graphs G1, G2, and G3 in FIG. 11, the detection device 10 determines that the object contacting the contact surface 31 is the finger F. For example, when the width in the first direction Dx changes with change of the magnitude of force applied to the detection device 10 as illustrated with the graph G4, the detection device 10 determines that the object contacting the contact surface 31 is a finger model, and regards that unauthorized authentication is to be performed.

The first authentication processing is described above. The following describes the second authentication processing with reference to FIGS. 12 and 13.

Figure 12:
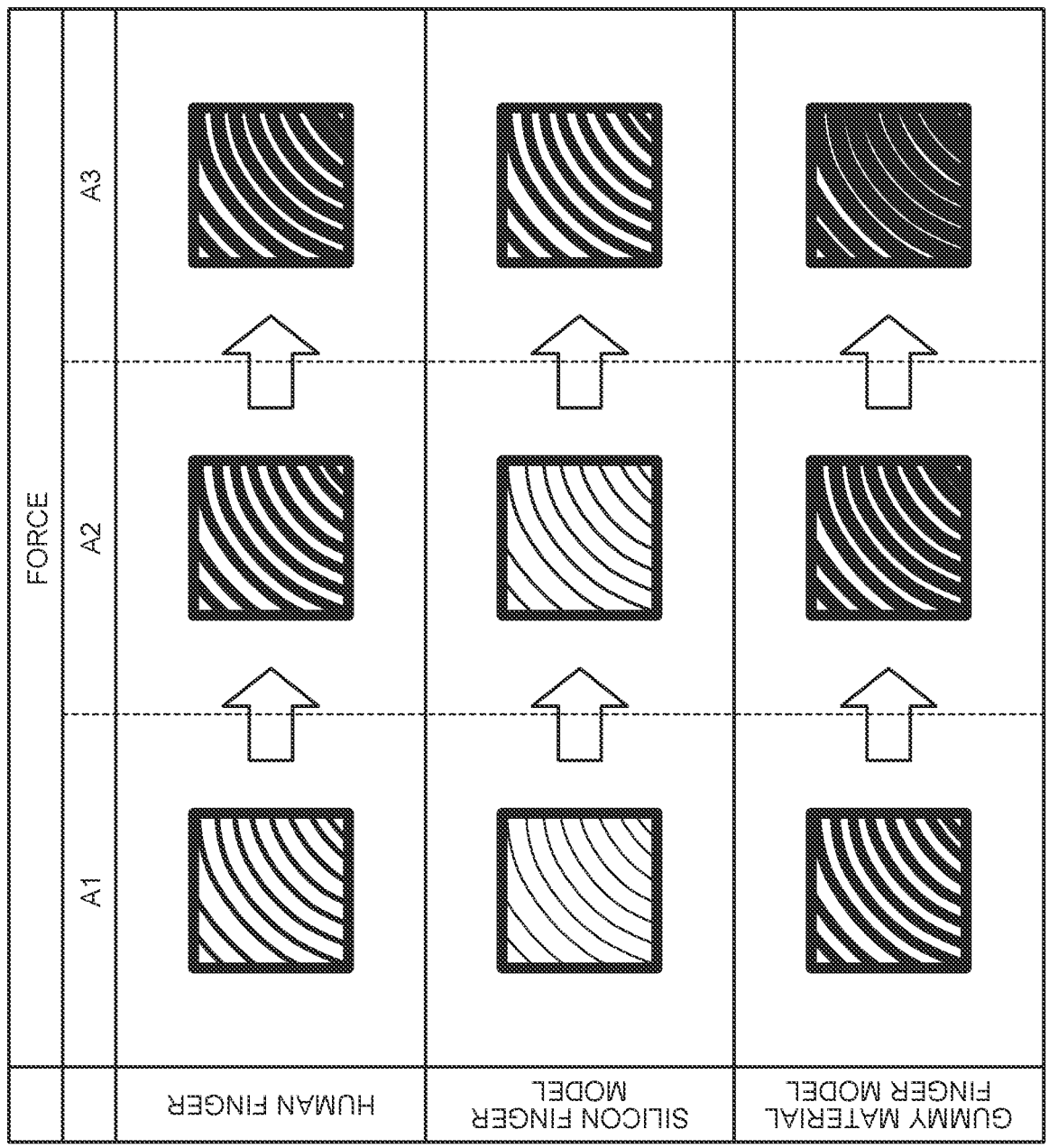
FIG. 12 is a schematic diagram illustrating the relation of each of the fingerprint density of a finger read by the pattern detector and the densities of fingerprint patterns of a silicon finger model and a gummy material finger model with force change.

FIG. 12 is a schematic diagram illustrating the relation of each of the fingerprint density of the finger F read by the pattern detector 20 and the densities of the fingerprint patterns of the silicon finger model and the gummy material finger model with force change. In the "force" column in FIG. 12, "A1", "A2", and "A3" are forces of A1, A2, and A3 described above with reference to FIG. 11. In FIG. 12, the non-contact portion between the contact surface 31 and an external object is illustrated in white, and the contact portion between the contact surface 31 and the external object is illustrated in black.

As illustrated in FIG. 12, the fingerprint density of the finger F read by the pattern detector 20 changes in accordance with change of force applied to the detection device 10 by the finger F. The density of a fingerprint pattern read by the pattern detector 20 when each finger model is pressed against the detection device 10 changes in accordance with change of force applied to the detection device 10. It should be noted that the "density" in both the "fingerprint density" and the "density of a fingerprint pattern" means the ratio of the contact portion between the contact surface 31 and an external object relative to the non-contact portion between the contact surface 31 and the external object.

The change pattern of the fingerprint density of the finger F read by the pattern detector 20 with change of force applied to the detection device 10 is referred to as a first change pattern. The change pattern of the density of the fingerprint pattern of the silicon finger model read by the pattern detector 20 with change of force applied to the detection device 10 is referred to as a second change pattern. The change pattern of the density of the fingerprint pattern of the gummy material finger model read by the pattern detector 20 with change of force applied to the detection device 10 is referred to as a third change pattern. The first change pattern, the second change pattern, and the third change pattern are different from one another.

In the case of the finger F in the example illustrated in FIG. 12, the fingerprint density sequentially increases as force sequentially increases from A1 through A2 to A3. However, in the case of the finger F, no filling of a read pattern occurs even when a force of A3 is applied. Filling of a read pattern means a state in which almost no non-contact portion between the contact surface 31 and an external object exists and the read pattern is mostly filled with the contact portion between the contact surface 31 and the external object.

However, in the case of the silicon finger model, the fingerprint pattern density hardly changes as force changes from A1 to A2. In the case of the silicon finger model, the fingerprint pattern density becomes extremely high as force changes from A2 to A3.

In the case of the gummy material finger model, like the case of the finger F, the fingerprint pattern density sequentially increases as force sequentially increases from A1 through A2 to A3. However, in the case of the gummy material finger model, the fingerprint pattern density starts with unnaturally high when force is a force of substantially A1. Furthermore, in the case of the gummy material finger model, filling of a read pattern occurs when force reaches substantially A3.

FIG. 12 exemplifies a read pattern in an area corresponding to one partial region PA in the detection region SA. In any partial region PA included in the detection region SA and positioned in an area contacting the contact surface 31 when force applied to the detection device 10 is a force of substantially A1, the density changes with force change in the same manner as the change of the read pattern exemplified in FIG. 12.

Figure 13:
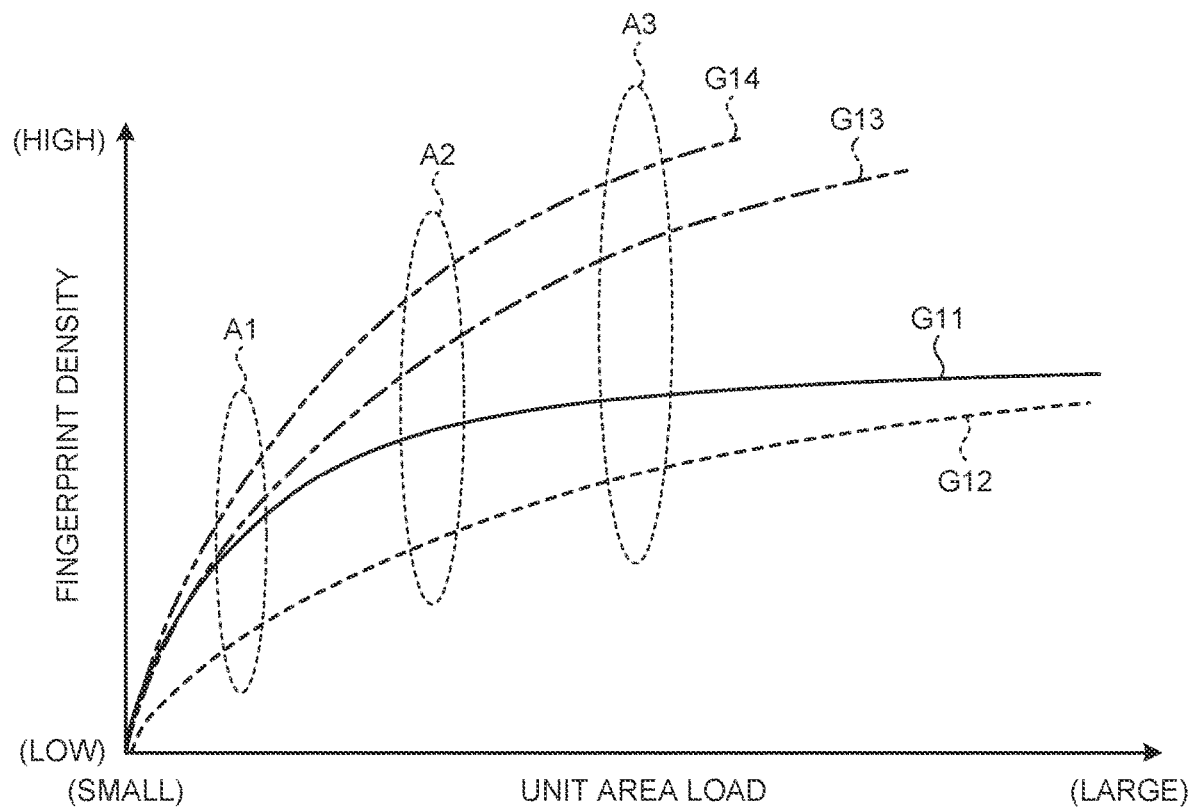
FIG. 13 is a graph illustrating the relation of each of the fingerprint density of a finger read by the pattern detector and the densities of the fingerprint patterns of the silicon finger model and the gummy material finger model with force change.

FIG. 13 is a graph illustrating the relation of each of the fingerprint density of the finger F read by the pattern detector 20 and the densities of the fingerprint patterns of the silicon finger model and the gummy material finger model with force change. A graph G11 illustrates the first change pattern. Graphs G12 and G13 illustrate the second change pattern. A graph G14 illustrates the third change pattern.

As illustrated in FIG. 13, the first change pattern, the second change pattern, and the third change pattern are different from one another. Among the graphs G12 and G13 of the second change pattern, the graph G12 corresponds to the silicon finger model described above with reference to FIG. 12. The graph G13 corresponds to a case in which silicon rubber softer than silicon rubber as the material of the silicon finger model described above with reference to FIG. 12 is employed. Thus, with any finger model, it is extremely difficult to obtain the same relation between force and density as that obtained with the finger F.

The detection device 10 performs, as the second authentication processing described above, processing of determining whether the relation between force and the change pattern of the fingerprint density follows the first change pattern (the graph G11 in FIG. 13) described above. When the relation between force and the change pattern of the fingerprint density follows the first change pattern, the detection device 10 determines that an object contacting the contact surface 31 is the finger F. When the relation between force and the change pattern of the fingerprint density does not follow the first change pattern, the detection device 10 determines that the object contacting the contact surface 31 is a finger model, and regards that unauthorized authentication is to be performed.

In the second authentication processing, it is possible to perform determination with further reduced influence of fingerprint positional shift by measuring density change at positions of the same fingerprint pattern. For example, in the example illustrated in FIG. 16 to be described later, an overlapping area FM11 among FM11, FM12, and FM13 is set as a central area, and the relation of (capacitance) density data corresponding to total force applied in the central area is extracted. The total force applied in the central area is the sum of pressing forces obtained from partial regions PA that are detection portions of a plurality of force sensors included in the central area. The total force applied in the central area corresponds to density (the fingerprint density of the finger F or fingerprint pattern density) obtained at the second authentication processing. Thus, the relation between the magnitude of force and density becomes clearer by extracting the relation of the density data corresponding to the total force applied in the central area. Moreover, when shift of the finger relative to the detection device 10 occurs while the finger is pressed against the detection device 10, fingerprint positional shift, in other words, positional shift of the finger relative to the detection device 10 can be traced with respect to the fingerprint pattern. This makes it possible to perform determination with further reduced influence of fingerprint positional shift. The second authentication processing can be performed for each partial region PA but may be performed for the entire contact region between the contact surface 31 and an external object (for example, the finger F) to support a usage in which the same concavity and convexity pattern of the fingerprint is not necessarily positioned in an area corresponding to the same partial regions PA at both acquisition of density change pattern data to be described later and acquisition of authentication density data.

The second authentication processing is described above. The following describes data used for authentication of the fingerprint FP with reference to FIGS. 14 and 15 before describing the third authentication processing.

Figure 14:
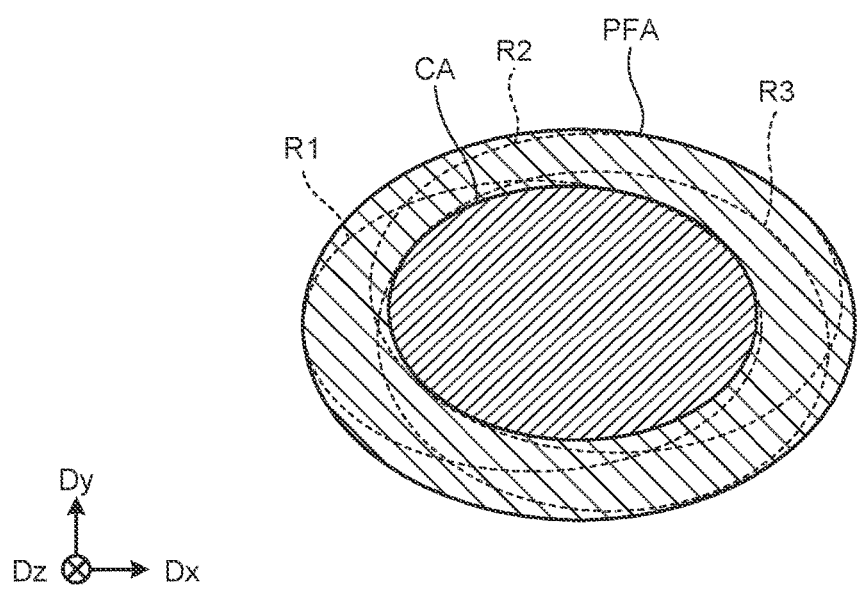
FIG. 14 is a schematic diagram illustrating the relation between sample data in collation data generation, a central region, and a peripheral region.

FIG. 14 is a schematic diagram illustrating the relation between sample data R1, R2, and R3 in collation data generation, a central region CA, and a peripheral region PFA. In fingerprint authentication, registration processing of registering data indicating characteristics of the fingerprint FP of the finger F of the user as characteristic data is performed in advance. Specifically, user authentication is performed based on the result of collation between the characteristics of the fingerprint FP indicated by the data and characteristics of a fingerprint FP newly read by the pattern detector 20 at authentication processing.

The characteristic data is obtained by extracting characteristic points such as a central point, a branch point, an end point, and a delta included in the fingerprint and recording the positional relation between the characteristic points in plan view. The detection device 10 can perform authentication determination of the user through fingerprint collation by collating the characteristic points indicated by the characteristic data and characteristic points included in two-dimensional data indicated by the touch detection data newly obtained through reading of the fingerprint FP by the pattern detector 20 of the detection device 10 at authentication processing. The basic mechanism of such fingerprint collation is the same as a well-known mechanism, and thus more detailed description thereof is omitted.

In the embodiment, reading of the fingerprint FP by the pattern detector 20 of the detection device 10 is performed a plurality of times in the registration processing. The areas of the fingerprint FP read at the respective readings of the fingerprint FP do not completely match. Some parts overlap and some other parts do not overlap as in, for example, the relation between the sample data R1, R2, and R3 illustrated in FIG. 14. The sample data R1 indicates a read pattern of the fingerprint FP obtained at the first reading among three readings of the fingerprint FP. The sample data R2 indicates a read pattern of the fingerprint FP obtained at the second reading among the three readings of the fingerprint FP. The sample data R3 indicates a read pattern of the fingerprint FP obtained at the third reading among the three readings of the fingerprint FP. The number of repetitions of reading of the fingerprint FP performed in the registration processing is not limited to three but may be two or may be equal to or larger than four.

In the embodiment, a pattern of the fingerprint FP that is included in and common to read patterns of the fingerprint FP obtained in the reading of the fingerprint FP performed a plurality of times is acquired as the central region CA. In FIG. 14, an elliptical region within an area where all sample data R1, R2, and R3 overlap is acquired as the central region CA. In the embodiment, the other patterns that are respectively included in the read patterns of the fingerprint FP obtained in the reading of the fingerprint FP performed a plurality of times but are not acquired as the central region CA may or may not be acquired as the peripheral region PFA.

Figure 15:
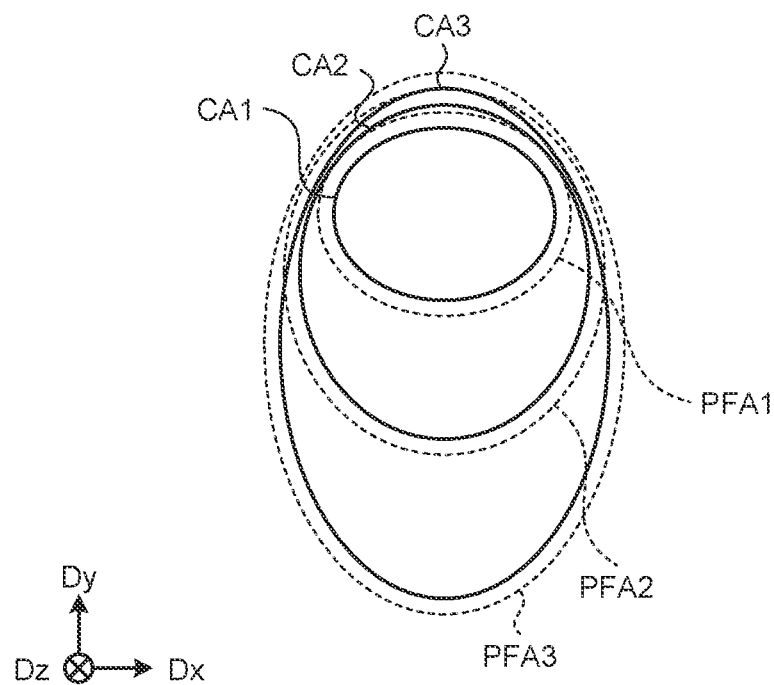
FIG. 15 is a schematic diagram illustrating the central region corresponding to a contact region and the peripheral region around the central region.

FIG. 15 is a schematic diagram illustrating central regions CA1, CA2, and CA3 corresponding to the contact regions MA1, MA2, and MA3 and peripheral regions PFA1, PFA2, and PFA3 around the central regions CA1, CA2, and CA3. As described above with reference to FIGS. 8 to 10, the contact regions MA1, MA2, and MA3 are acquired in the first authentication processing. Similarly, acquisition of the characteristic data in the registration processing is performed for each of the central regions CA1, CA2, and CA3 corresponding to the contact regions MA1, MA2, and MA3. Specifically, the central region CA1 is the central region CA obtained at a timing when a force of A1 is applied to the detection device 10 by the finger F in sample data acquisition performed a plurality of times. The central region CA2 is the central region CA obtained at a timing when a force of A2 is applied to the detection device 10 by the finger F in sample data acquisition performed a plurality of times. The central region CA3 is the central region CA obtained at a timing when a force of A3 is applied to the detection device 10 by the finger F in sample data acquisition performed a plurality of times. The peripheral region PFA obtained in acquisition of the central region CA1 may be handled as the peripheral region PFA1. The peripheral region PFA obtained in acquisition of the central region CA2 may be handled as the peripheral region PFA2. The peripheral region PFA obtained in acquisition of the central region CA3 may be handled as the peripheral region PFA3. As with the central regions CA1, CA2, and CA3, the peripheral regions PFA1, PFA2, and PFA3 may be used for the fingerprint collation.

Figure 16:
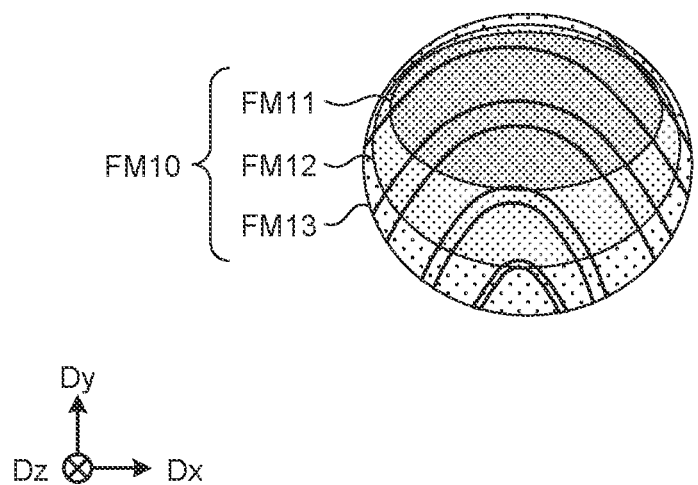
FIG. 16 is a schematic diagram illustrating an exemplary positional relation between a first force region, a second force region, and a third force region included in a force detection region.

FIG. 16 is a schematic diagram illustrating an exemplary positional relation between a first force region FM11, a second force region FM12, and a third force region FM13 included in a force detection region FM10. In the registration processing, force characteristic data is acquired in addition to the characteristic data described above. The force characteristic data indicates a strength distribution of force detected by the force detector 30 in an area obtained as the central region CA at acquisition of the characteristic data. In FIG. 16, the force detection region FM10 is a region in which force is detected by the force detector 30 in the area obtained as the central region CA.

Figure 17:
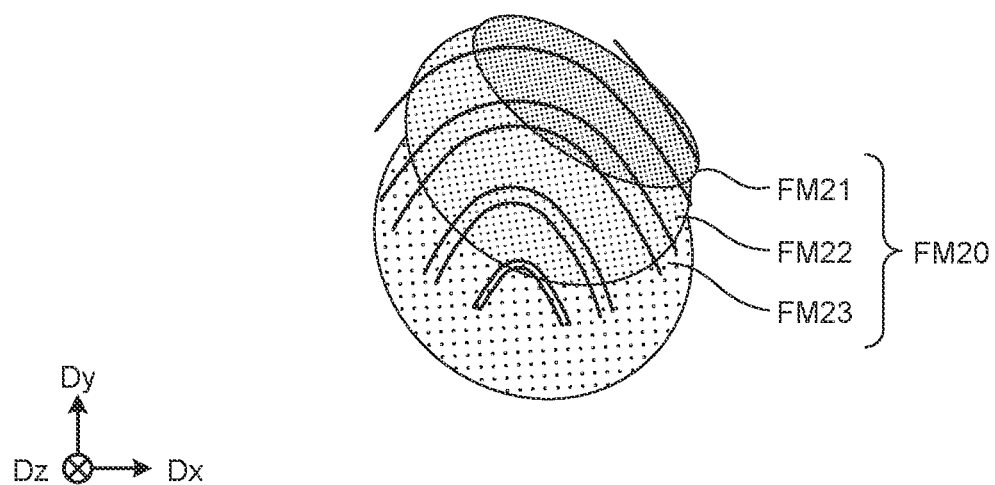
FIG. 17 is a schematic diagram illustrating an exemplary positional relation between the first force region, the second force region, and the third force region included in the force detection region.

The force characteristic data is acquired such that the described-above region in which force is detected by the force detector 30 is classified into a plurality of kinds of regions based on the magnitude of force detected by each partial region PA. In FIG. 16 and FIG. 17 to be described later, first force regions FM11 and FM21 are regions in which relatively large force is detected. The third force regions FM13 and FM23 are regions in which relatively small force is detected. The second force region FM12 is a region in which middle force between the force detected in the first force region FM11 and the force detected in the third force region FM13 is detected. The second force region FM22 is a region in which middle force between the force detected in the first force region FM21 and the force detected in the third force region FM23 is detected.

Classification based on the magnitude of force, such as classification into the first force region FM11, the second force region FM12, and the third force region FM13 can be achieved by, for example, setting thresholds for classifying force in advance. For example, a first threshold and a second threshold larger than the first threshold may be set in advance. In this case, a region in which force equal to or larger than the second threshold is detected may be determined as a region in which relatively large force is detected. A region in which force smaller than the first threshold is detected may be determined as a region in which relatively small force is detected. A region in which force equal to or larger than the first threshold and smaller than the second threshold is detected may be determined as a region in which middle force is detected.

As illustrated in FIG. 16, the force detection region FM10 includes the first force region FM11, the second force region FM12, and the third force region FM13. In the registration processing, data indicating a force magnitude distribution is acquired as the force characteristic data, as in the force detection region FM10. In the embodiment, acquisition of the force characteristic data is individually performed at each of acquisition of the central region CA1, acquisition of the central region CA2, and acquisition of the central region CA3.

FIG. 17 is a schematic diagram illustrating an exemplary positional relation between the first force region FM21, the second force region FM22, and the third force region FM23 included in a force detection region FM20. There is individual difference in distribution of force applied to the detection device 10 by the finger F when the fingerprint FP is detected. Furthermore, it is difficult to create a force distribution depending on such individual difference by using a finger model. For example, the positional relation between the first force region FM21, the second force region FM22, and the third force region FM23 included in the force detection region FM20 illustrated in FIG. 17 is different from the positional relation between the first force region FM11, the second force region FM12, and the third force region FM13 included in the force detection region FM10 illustrated in FIG. 16. Thus, for example, when a distribution of force detected by the detection device 10 in detection of the fingerprint FP performed at authentication processing of a user for which the force detection region FM10 is already registered as the force characteristic data is the same as that for the force detection region FM20, it is highly likely that authentication is performed by another user different from the user. In this case, when fingerprint characteristic amount patterns match, it is highly likely that authentication with a finger model is performed.

The detection device 10 performs, as the third authentication processing described above, processing of determining whether the force characteristic data registered in advance and data (the force detection data) indicating the distribution of force newly detected by the force detector 30 when the finger F is pressed against the detection device 10 at authentication processing are identical or similar to each other to such an extent that it can be determined that the force characteristic data and the force detection data belong to the same person. When it is determined that the force characteristic data and the force detection data belong to the same person, the detection device 10 determines that an object contacting the contact surface 31 is the finger F of a valid user. When it is not determined that the force characteristic data and the force detection data belong to the same person, the detection device 10 determines that the object contacting the contact surface 31 is not the finger F of a valid user, and regards that unauthorized authentication is to be performed.

In the embodiment, determination is performed a plurality of times in the third authentication processing. For example, the third authentication processing includes first to third determinations. The first determination is based on the force characteristic data indicating a force distribution when the central region CA1 is acquired and based on a force distribution indicated by the force detection data when the contact region MA1 is acquired. The second determination is based on the force characteristic data indicating a force distribution when the central region CA2 is acquired and based on a force distribution indicated by the force detection data when the contact region MA2 is acquired. The third determination is based on the force characteristic data indicating a force distribution when the central region CA3 is acquired and based on a force distribution indicated by the force detection data when the contact region MA3 is acquired. In each determination, it is determined whether the force characteristic data and the force detection data belong to the same person.

Figure 18:
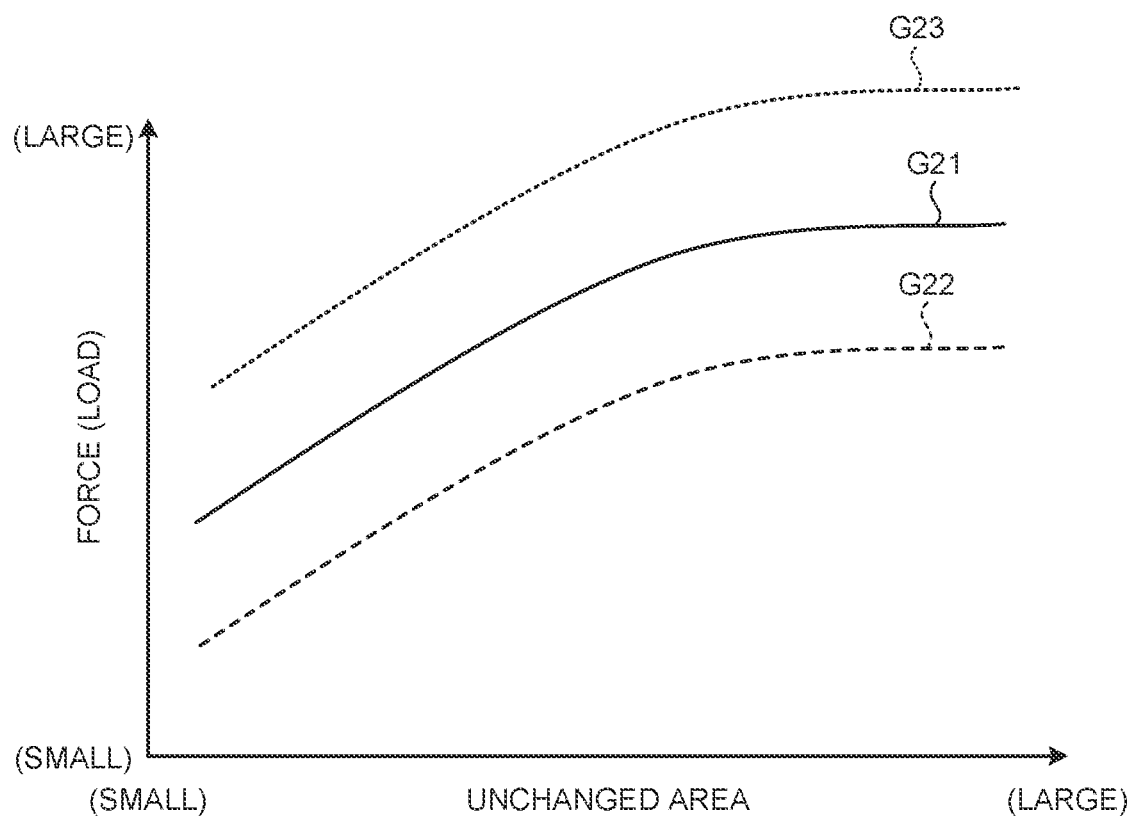
FIG. 18 is a schematic graph illustrating an allowable range of a force error in third authentication processing.

FIG. 18 is a schematic graph illustrating an allowable range of a force error in the third authentication processing. A force distribution indicated by the force characteristic data and a force distribution newly acquired in user authentication processing are likely to be similar to each other but hardly completely identical to each other. Thus, in the embodiment, an allowable range of the error between the force distribution indicated by the force characteristic data and the force distribution newly acquired in the user authentication processing is predetermined.

Assume that there is a partial region PA having a magnitude relation of the areas of the fingerprint FP read in acquisition of the characteristic data and a magnitude relation of forces acquired in acquisition of the force characteristic data, both of which are represented by a graph G21 illustrated in FIG. 18, for example. In this case, when the relation between force indicated by the force detection data acquired in authentication processing and the area of the fingerprint FP read when the force detection data is obtained is located between graphs G22 and G23 illustrated in FIG. 18, it is determined that the force detection data and the force characteristic data are obtained from the same user.

The magnitude (±d) of the difference (−d) between the graph G22 and the graph G21 and the difference (+d) between the graph G23 and the graph G21 can be freely set but preferably such that validity at a certain level or higher can be secured in user identity authentication. For example, a test or verification is performed in advance in which a plurality of users perform pressing of the finger F against the detection device 10 a plurality of times, and a plurality of fingerprints FP are acquired for each user. Based on the difference between minimum force and maximum force exerted by each user in the test, a level of error that does not allow authentication attempt by the same user to be excluded can be derived. An appropriate ±d can be set based on such a test or verification.

The above description with reference to FIG. 18 is made on the error, such as a force error (+d), between user authentication data acquired in advance and data newly acquired at authentication processing. However, such errors are not limited to occurring in the third authentication processing but may occur in the first authentication processing and the second authentication processing. Thus, in the embodiment, for the first authentication processing and the second authentication processing as well, a test or verification is performed beforehand on an allowable error between user authentication data acquired in advance and data newly acquired at authentication processing and an appropriate error is set.

Figure 19:
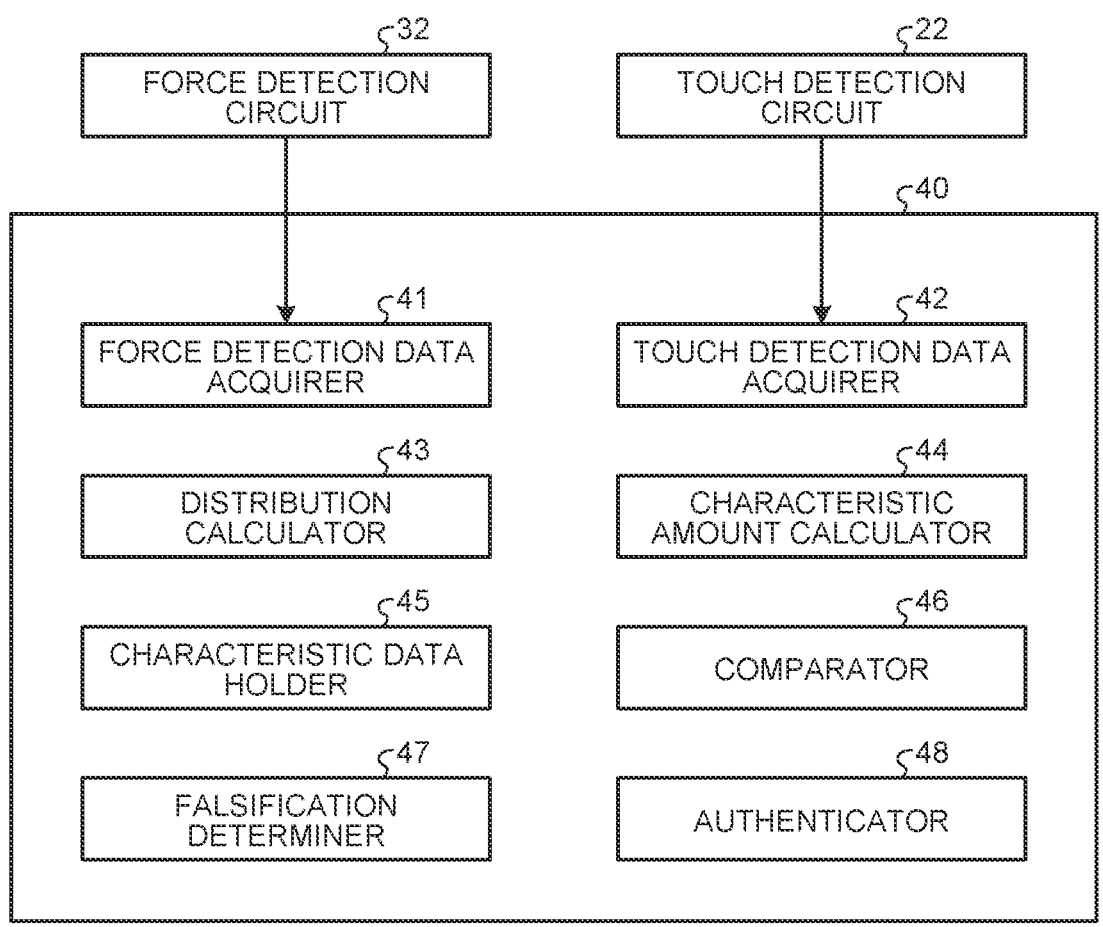
FIG. 19 is a block diagram illustrating a functional configuration of a controller.

The following describes a configuration for performing authentication processing with reference to FIG. 19.

FIG. 19 is a block diagram illustrating a functional configuration of a controller 40. The controller 40 is a circuit provided in the detection device 10. The controller 40 is provided as an integrated circuit such as an application specific integrated circuit (ASIC) or a field programmable gate array (FPGA). The controller 40 is mounted on, for example, a flexible printed circuit (FPC) coupled to the pattern detector 20 and the force detector 30. In addition, the contact surface 31 and the touch detection circuit 22 of the pattern detector 20, a power circuit 31 of the force detector 30, and part or all of the force detection circuit 32 may be provided in the FPC.

The controller 40 includes a force detection data acquirer 41, a touch detection data acquirer 42, a distribution calculator 43, a characteristic amount calculator 44, a characteristic data holder 45, a comparator 46, a falsification determiner 47, and an authenticator 48.

The force detection data acquirer 41 acquires the force detection data from the force detection circuit 32. The touch detection data acquirer 42 acquires the touch detection data from the touch detection circuit 22.

The distribution calculator 43 generates the force characteristic data based on the force detection data. Specifically, for example, the distribution calculator 43 receives a plurality of pieces of the force detection data obtained by sample data acquisition performed a plurality of times before authentication processing. Then the distribution calculator 43 generates two-dimensional map data by averaging, by the coordinates of each partial region PA, a force magnitude distribution indicated by the force detection data, and sets the two-dimensional map data as the force characteristic data. The force characteristic data according to the embodiment includes two-dimensional map data indicating a force magnitude distribution in the central region CA1, two-dimensional map data indicating a force magnitude distribution in the central region CA2, and two-dimensional map data indicating a force magnitude distribution in the central region CA3.

The distribution calculator 43 also generates, based on the force detection data newly acquired in user authentication processing, two-dimensional map data (authentication force distribution data) indicating each of the force distribution at the time of acquisition of the contact region MA1, the force distribution at the time of acquisition of the contact region MA2, and the force distribution at the time of acquisition of the contact region MA3.

The distribution calculator 43 also generates data (dimension change pattern data) indicating the change pattern of the first dimension, the change pattern of the second dimension, and the change pattern of the third dimension described above with reference to FIGS. 8 to 11. Specifically, among the touch detection data obtained by sample data acquisition, the touch detection data at a timing when the central region CA1 is obtained, the touch detection data at a timing when the central region CA2 is obtained, and the touch detection data at a timing when the central region CA3 is obtained, are processing targets of the distribution calculator 43. The distribution calculator 43 determines the dimension in the first direction Dx of fingerprint image data indicated by the touch detection data at a timing when the central region CA1 is obtained, determines the position of a middle point of the fingerprint image data in the second direction Dy, determines the dimension from the middle point of the fingerprint image data to one end side thereof in the second direction Dy, and determines the dimension from the middle point of the fingerprint image data to the other end side thereof in the second direction Dy. In addition, the distribution calculator 43 determines the dimension in the first direction Dx of fingerprint image data indicated by the touch detection data at a timing when the central region CA2 is obtained, determines the dimension from the position of a middle point of the fingerprint image data to one end side thereof in the second direction Dy, and determines the dimension from the position of the middle point of the fingerprint image data to the other end side thereof in the second direction Dy. In addition, the distribution calculator 43 determines the dimension in the first direction Dx of fingerprint image data indicated by the touch detection data at a timing when the central region CA3 is obtained, determines the dimension from the position of a middle point of the fingerprint image data to one end side thereof in the second direction Dy, and determines the dimension from the position of the middle point of the fingerprint image data to the other end side thereof in the second direction Dy. The distribution calculator 43 sets data indicating these determined dimensions as change pattern data.

Based on the touch detection data newly acquired at user authentication processing, the distribution calculator 43 generates data (authentication dimension data) indicating the change pattern of the first dimension, the change pattern of the second dimension, and the change pattern of the third dimension at the time of authentication. Specifically, the distribution calculator 43 generates the authentication dimension data from the dimension, position, and area of a fingerprint image at the time of acquisition of the contact region MA1, the dimension, position, and area of a fingerprint image at the time of acquisition of the contact region MA2, and the dimension, position, and area of a fingerprint image at the time of acquisition of the contact region MA3.

The dimensions in the embodiment do not necessarily need to be based on a length unit in the metric system or the like but may be based on the resolution of the pattern detector 20 in the detection region SA. For example, the dimensions can be expressed in the range of 0 to 640 when the resolution of the pattern detector 20 in the detection region SA is 640×640.

The distribution calculator 43 generates data (density change pattern data) indicating the change pattern of the fingerprint density, which is described above with reference to FIGS. 12 and 13. Specifically, among the touch detection data obtained by sample data acquisition, the touch detection data at a timing when the central region CA1 is obtained, the touch detection data at a timing when the central region CA2 is obtained, and the touch detection data at a timing when the central region CA3 is obtained, are processing targets of the distribution calculator 43. The distribution calculator 43 calculates the fingerprint density of a fingerprint image indicated by the touch detection data at a timing when the central region CA1 is obtained. The distribution calculator 43 also calculates the fingerprint density of a fingerprint image indicated by the touch detection data at a timing when the central region CA2 is obtained. The distribution calculator 43 also calculates the fingerprint density of a fingerprint image indicated by the touch detection data at a timing when the central region CA3 is obtained. The distribution calculator 43 sets data indicating these calculated fingerprint densities as density change pattern data.

Based on the touch detection data newly acquired at user authentication processing, the distribution calculator 43 calculates the density of a fingerprint image at the time of acquisition of the contact region MA1, the density of a fingerprint image at the time of acquisition of the contact region MA2, and the density of a fingerprint image at the time of acquisition of the contact region MA3, and generates data (authentication density data) indicating the density of a fingerprint (or finger pattern image) at the time of authentication.

The characteristic amount calculator 44 performs characteristic amount calculation. In the characteristic amount calculation, the touch detection data is regarded as binary image data, fingerprint characteristic points included in this binary image are extracted, and the kinds and positional relation of the characteristic points are determined. The extraction area of the characteristic point in the characteristic amount calculation is, for example, inside the central region CA3 or inside the contact region MA3 described above. At acquisition of user characteristic data before authentication processing, the characteristic amount calculator 44 sets, as the characteristic data, data indicating the result of the characteristic amount calculation based on the central region CA3.

The characteristic data holder 45 stores and holds the force characteristic data, the dimension change pattern data, the density change pattern data, and the characteristic data. The force characteristic data, the dimension change pattern data, the density change pattern data, and the characteristic data are individually generated and held for each user. The force characteristic data, the dimension change pattern data, the density change pattern data, and the characteristic data can be regarded as user authentication data acquired in advance.

The characteristic data holder 45 according to the embodiment has a storage region in which temporary data to be described later is stored and held. A storage unit may be provided as the storage region separately from the characteristic data holder 45.

The comparator 46 performs processing related to comparison of data (the authentication force distribution data, the authentication dimension data, the authentication density data, and data indicating the result of the characteristic amount calculation based on the contact region MA3) generated by the distribution calculator 43 and the characteristic amount calculator 44 based on the touch detection data and the force detection data newly acquired through the detection device 10 at authentication processing, with the force characteristic data, the dimension change pattern data, the density change pattern data, and the characteristic data that are held in the characteristic data holder 45.

Specifically, at the first authentication processing described above, the comparator 46 performs first comparison processing of comparing a dimension change pattern indicated by the authentication dimension data with a dimension change pattern indicated by dimension change data. At the second authentication processing described above, the comparator 46 performs second comparison processing of comparing a density change pattern indicated by the authentication density data with a fingerprint image density change pattern indicated by the density change pattern data. At the third authentication processing described above, the comparator 46 performs third comparison processing of comparing a force distribution indicated by the authentication force distribution data with a force distribution indicated by the force characteristic data. At the fingerprint collation, the comparator 46 performs fourth comparison processing of comparing the data indicating the result of the characteristic amount calculation based on the contact region MA3 with the characteristic data.

The falsification determiner 47 performs truth determination of the finger F based on the first comparison processing, the second comparison processing, and the third comparison processing in the processing performed by the comparator 46. In other words, the falsification determiner 47 determines whether an external object pressed against the detection device 10 at authentication processing is the finger F or a finger model.

Specifically, the falsification determiner 47 determines that the first authentication processing is successful when the result of the comparison of the dimension change pattern indicated by the authentication dimension data with the dimension change pattern indicated by the dimension change data in the first comparison processing is in the range of an error with which it can be regarded that the patterns belong to the same user. The falsification determiner 47 determines that the first authentication processing is not successful when the result of the comparison of the dimension change pattern indicated by the authentication dimension data with the dimension change pattern indicated by the dimension change data in the first comparison processing exceeds the range of an error with which it can be regarded that the patterns belong to the same user.

The falsification determiner 47 determines that the second authentication processing is successful when the result of the comparison of the density change pattern indicated by the authentication density data with the fingerprint image density change pattern indicated by the density change pattern data in the second comparison processing is in the range of an error with which it can be regarded that the patterns belong to the same user. The falsification determiner 47 determines that the second authentication processing is not successful when the result of the comparison of the density change pattern indicated by the authentication density data with the fingerprint image density change pattern indicated by the density change pattern data in the second comparison processing exceeds the range of an error with which it can be regarded that the patterns belong to the same user.

The falsification determiner 47 determines that the third authentication processing is successful when the result of the comparison of the force distribution indicated by the authentication force distribution data with the force distribution indicated by the force characteristic data in the third comparison processing is in the range of an error with which it can be regarded that the patterns belong to the same user. The falsification determiner 47 determines that the third authentication processing is not successful when the result of the comparison of the force distribution indicated by the authentication force distribution data with the force distribution indicated by the force characteristic data in the third comparison processing exceeds the range of an error with which it can be regarded that the patterns belong to the same user.

Data indicating "the range of an error with which it can be regarded that the patterns belong to the same user" in each of the first comparison processing, the second comparison processing, and the third comparison processing, which are referred in the determination performed by the falsification determiner 47, may be registered and held in the falsification determiner 47 in advance or may be registered in the comparator 46 and allowed to be referred by the falsification determiner 47.

The authenticator 48 performs final determination of user authentication processing based on the results of the fourth comparison processing in processing performed by the comparator 46 and the determination by the falsification determiner 47. Specifically, the authenticator 48 determines that the fingerprint collation is successful when the data indicating the result of the characteristic amount calculation based on the contact region MA3 and the characteristic data are identical or similar to each other to such an extent that it can be recognized that fingerprints belong to the same user in the fourth comparison processing. The authenticator 48 determines that authentication processing by a valid user is successful when the fingerprint collation is successful and it is determined by the falsification determiner 47 that the first authentication processing, the second authentication processing, and the third authentication processing are successful. The authenticator 48 determines that fingerprint authentication is not successful when the fingerprint collation is not successful or when fingerprint authentication is successful but it is determined by the falsification determiner 47 that any one or more of the first authentication processing, the second authentication processing, and the third authentication processing are not successful.

Figure 20:
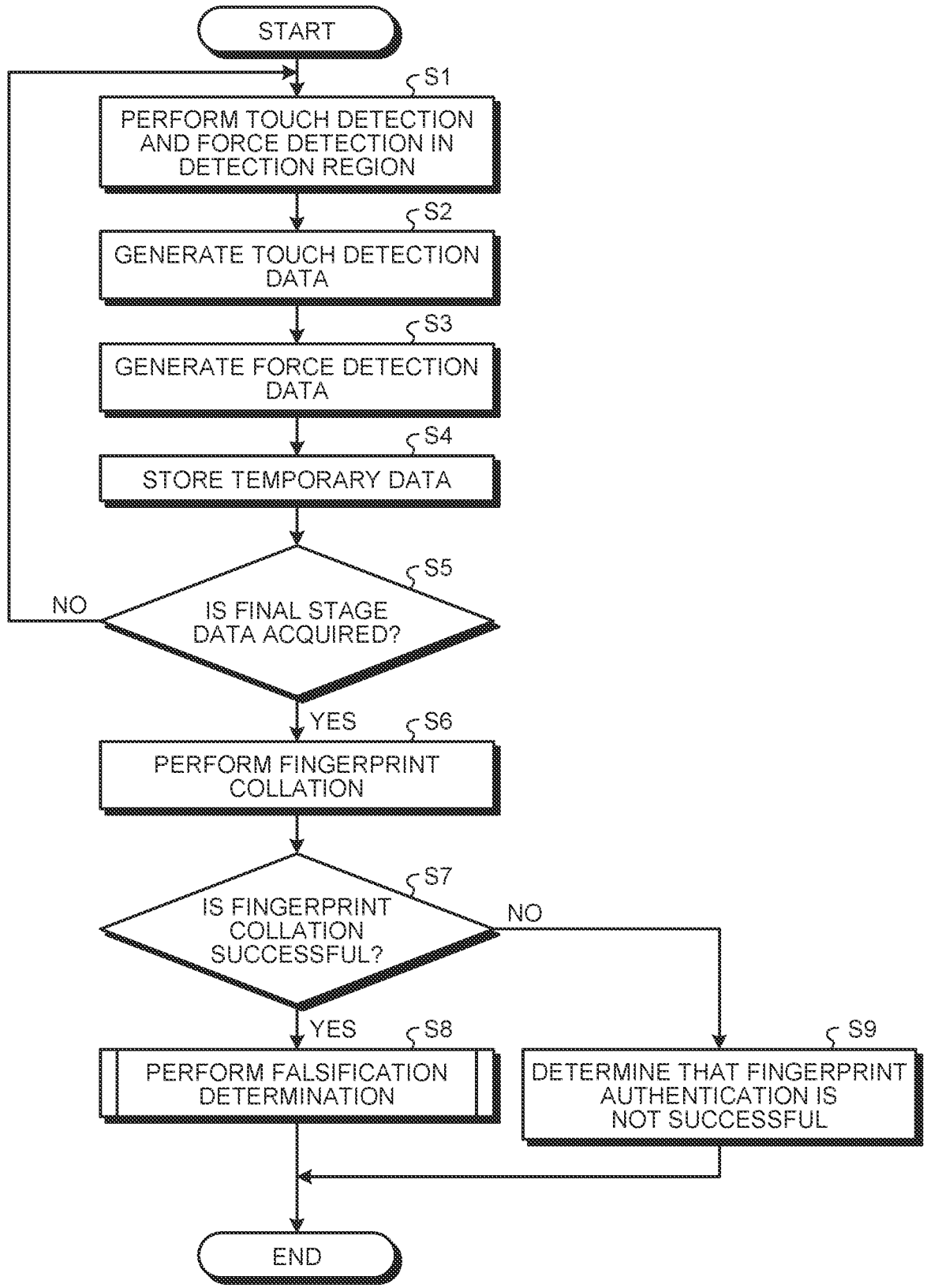
FIG. 20 is a flowchart illustrating the process of processing by the controller.

FIG. 20 is a flowchart illustrating the process of processing by the controller 40. First, touch detection and force detection are performed in the detection region SA (step S1). Specifically, for example, the fingerprint FP of the finger F (or the finger pattern of a finger model) is read through touch detection by the pattern detector 20. In addition, force applied by an object pressed against the detection device 10 is detected by the force detector 30. Following the processing at step S1, touch detection data generation (step S2) and force detection data generation (step S3) are performed. The processing at step S2 and the processing at step S3 may be performed in any order, may performed in parallel, or may be sequentially performed.

Touch detection data generated in the processing at step S2 and force detection data generated in the processing at step S3 are stored as temporary data in a storage region such as the characteristic data holder 45 (step S4). The controller 40 determines whether final stage data is acquired (step S5). The final stage data is data that is acquired last in time among data necessary in authentication processing. For example, among the contact region MA1, the contact region MA2, and the contact region MA3 described above with reference to FIGS. 8 to 10, the contact region MA3 is the final stage data.

When it is determined that the final stage data is yet to be acquired in the processing at step S5 (No at step S5), the process transitions to the processing at step S1 again. In the processing at step S4 performed again, the temporary data is not overwritten but is accumulatively stored and held in the storage region until authentication processing is completed. When it is determined that the final stage data is acquired in the processing at step S5 (Yes at step S5), the fingerprint collation is performed (step S6). Specifically, the comparator 46 performs the fourth comparison processing described above and the authenticator 48 determines, based on the fourth comparison processing, whether the data indicating the result of the characteristic amount calculation based on the contact region MA3 and the characteristic data are identical or similar to each other to such an extent that it can be recognized that fingerprints belong to the same user. When the fingerprint collation is not successful (No at step S7), it is determined that fingerprint authentication is not successful (step S9). When the fingerprint collation is successful (Yes at step S7), the falsification determination processing is performed (step S8).

The position of the finger F may be extracted from a fingerprint in the fingerprint collation and used for positioning in pressing detection thereafter. Alternatively, the position and orientation of the finger F may be extracted based on the coordinates of force distribution detected by the force detector 30; and then, translation, rotational transform, linear interpolation, and the like corresponding to the extracted position and orientation of the finger F may be performed on coordinate information related to a user fingerprint registered in advance, such as the characteristic data; whereby the accuracy of collation corresponding to the position and orientation of the finger F is further increased.

Figure 21:
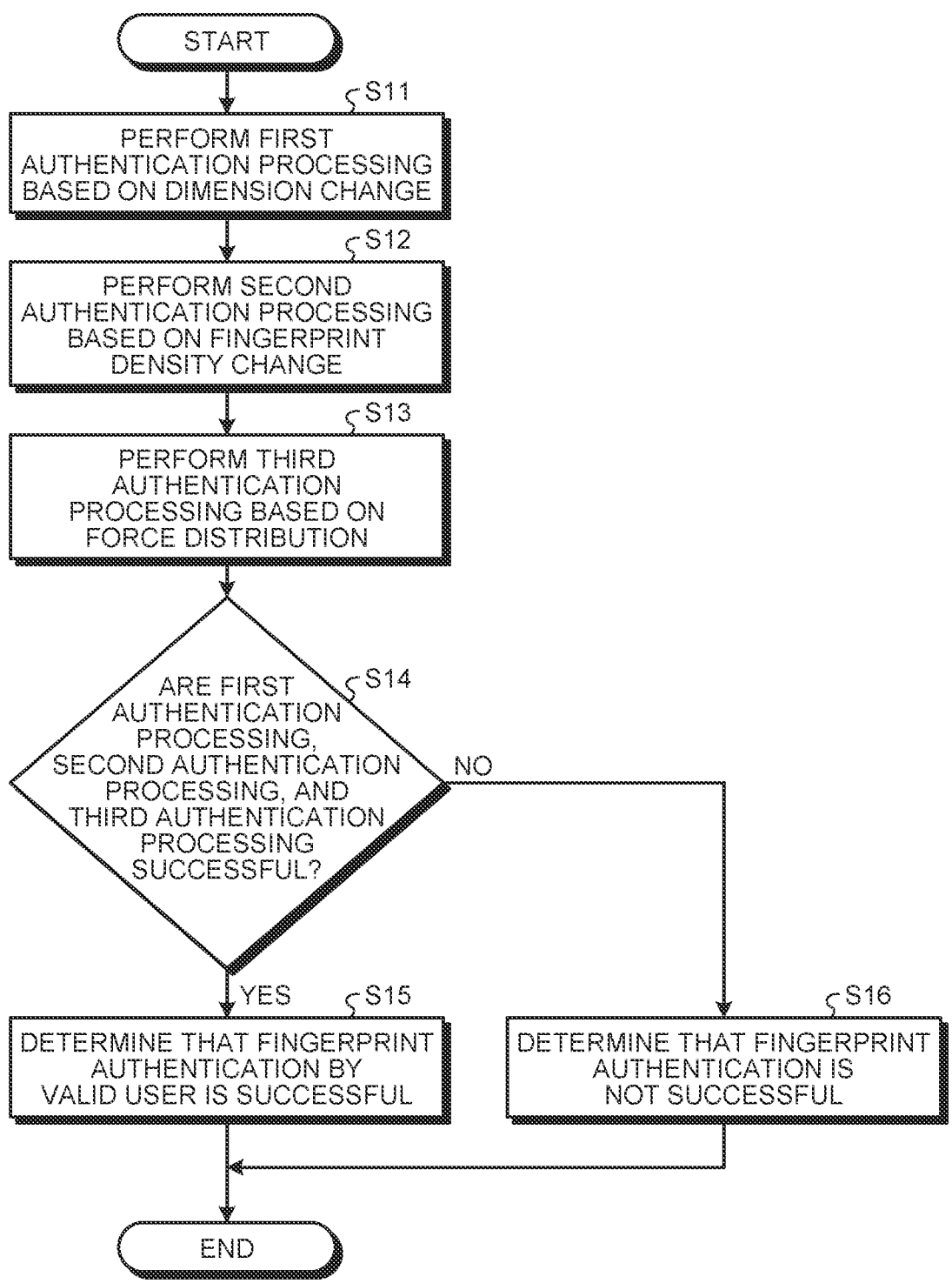
FIG. 21 is a flowchart illustrating the process of processing (falsification determination processing) at step S8 in FIG. 20.

FIG. 21 is a flowchart illustrating the process of the processing (falsification determination processing) at step S8 in FIG. 20. The controller 40 performs the first authentication processing based on fingerprint image dimension change indicated by the accumulatively stored temporary data (step S11). Specifically, the distribution calculator 43 generates the authentication dimension data based on the accumulatively stored touch detection data, and the comparator 46 performs the first comparison processing. The controller 40 also performs the second authentication processing based on fingerprint density change indicated by the accumulatively stored temporary data (step S12). Specifically, the distribution calculator 43 generates the authentication density data based on the accumulatively stored touch detection data, and the comparator 46 performs the second comparison processing. The controller 40 also performs the third authentication processing based on a force distribution indicated by the accumulatively stored temporary data (step S13). Specifically, the distribution calculator 43 generates the authentication force distribution data based on the accumulatively stored force detection data, and the comparator 46 performs the third comparison processing. The processing at step S11, the processing at step S12, and the processing at step S13 may be performed in any order, may performed in parallel, or may be sequentially performed.

The authenticator 48 determines whether the first authentication processing, the second authentication processing, and the third authentication processing are successful (step S14). When the first authentication processing, the second authentication processing, and the third authentication processing are successful (Yes at step S14), the authenticator 48 determines that the fingerprint collation by a valid user is successful (step S15). When it is determined that any one or more of the first authentication processing, the second authentication processing, and the third authentication are not successful (No at step S14), the authenticator 48 determines that fingerprint authentication is not successful (step S16).

The position and orientation of the finger F may be extracted based on touch detection and force detection in the processing at step S1 described above with reference to FIG. 20, and positioning for performing processing in accordance with the extracted position and orientation of the finger F may be additionally performed in the processing at step S8 (falsification determination processing).

Figure 22:
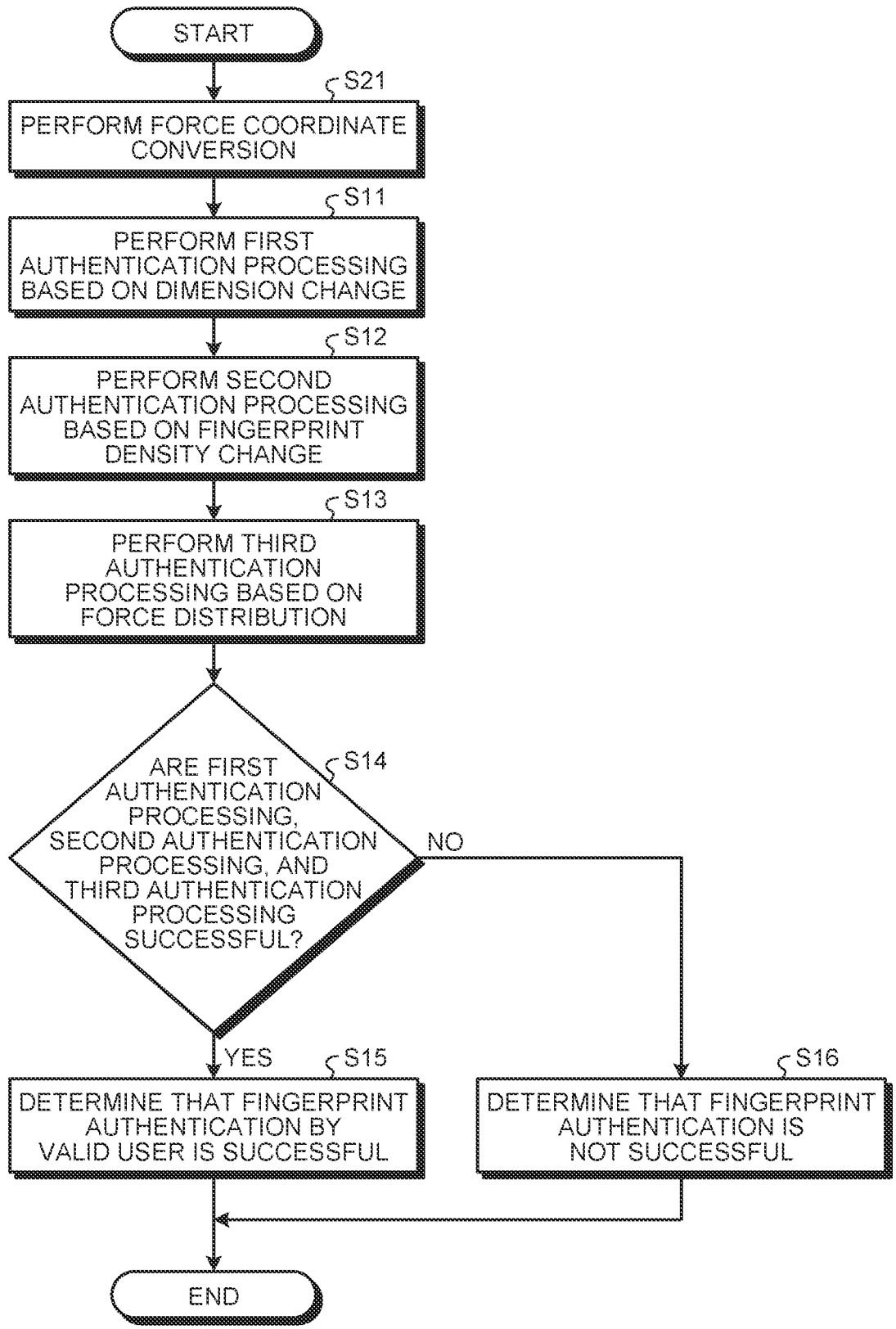
FIG. 22 is a flowchart illustrating the process of the processing (falsification determination processing) at step S8 when positioning is performed.

FIG. 22 is a flowchart illustrating the process of the processing at step S8 (falsification determination processing) when positioning is performed. In this method of performing positioning and collation, force coordinate conversion (step S21) is performed first. In the processing at step S21, the coordinates (x, y) of each of a touch detection position and a pressing detection position obtained in the processing at step S1 are converted into coordinates (u, v) corresponding to the coordinates of a fingerprint and pressing distribution at data registration of a user for which the fingerprint collation in the processing at step S7 is successful, and accordingly, coordinate matching between registered data and data at authentication is performed. In the first authentication processing (step S11), matching between the orientation of the finger F at data registration and the orientation of the finger F at authentication is additionally performed based on the processing at step S21. In the second authentication processing (step S12), a target area of measurement of the relation between force and density is determined from a fingerprint pattern obtained through the touch detection at step S1, force data when the sum total of forces in the corresponding area reaches a predetermined value is selected, and collation of a density map (u, v) or an in-area average Ave {density map (u, v)} is performed. In the third authentication processing (step S13), force data is selected, and collation of a capacitance map (u, v) or an in-area amount sum Sum {capacitance map (u, v)} is performed, in a similar manner to the second authentication processing.

At data registration for authentication, a plurality of timings (for example, timings when forces (the first force, the second force, the third force) corresponding to forces of A1, A2, and A3 described above, respectively, are detected by the force detector) are acquired in accordance with the entire force. The total sum of the forces in an area in which pressing detection is performed is potentially slightly different between registered data acquisition and authentication trial. To address this, registration may be performed in advance with a range (margin) of force at data registration. With this, the registered data can be used for authentication even when the in-area sum of the forces is slightly different between registered data acquisition and authentication trial.

As described above, according to the embodiment, the detection device 10 includes a pattern detector (the pattern detector 20) having a contact surface (the contact surface 31) that allows an external object to make contact therewith and configured to detect the concavity and convexity pattern of the fingerprint FP when the human finger F is pressed against the contact surface, a force detector (the force detector 30) configured to detect force applied to the contact surface, and a controller (the controller 40) configured to perform user authentication processing based on the pattern detected by the pattern detector and the force detected by the force detector. The controller stores in advance, reference data obtained by acquiring, at each of a plurality of timings when the human finger F is pressed against the contact surface, acquisition target data including data related to the pattern detected by the pattern detector, data related to the force detected by the force detector, or both data. The reference data is, for example, at least one of the force characteristic data, the dimension change pattern data, and the density change pattern data described above. The acquisition target data is, for example, at least one of dimension-related data described above with reference to FIGS. 8 to 11, fingerprint-density-related data described with reference to FIGS. 12 and 13, and force-distribution-related data described with reference to FIGS. 14 to 18. The controller acquires new data including the acquisition target data acquired at each of a plurality of timings when an external object is newly pressed against the contact surface. The controller determines whether the object pressed against the contact surface when the new data is acquired is the human finger F based on the difference between the acquisition target data indicated by the reference data acquired at the timings and the acquisition target data indicated by the new data acquired at the timings. The timings are two timings or more that are included in a pressing operation period from start to end of pressing of an external object against the contact surface, and the force detected by the force detector is different between the timings. For example, the timings are timings when forces (the first force, the second force, and the third force) corresponding to forces of A1, A2, and A3 described above, respectively, are detected by the force detector. Accordingly, whether the external object newly pressed against the contact surface is the human finger F can be determined based on the correspondence relation between the magnitude of force and the acquisition target data. Thus, according to the embodiment, the accuracy of determination of the human finger F can be further increased.

Each of the timings is a timing when predetermined force (for example, the first force, the second force, or the third force) is detected by the force detector (force detector 30). When the difference between the acquisition target data indicated by the reference data acquired at the timings and the acquisition target data indicated by the new data acquired at the timings is in a predetermined error range (for example, ±d), the controller (controller 40) determines that the object pressed against the contact surface (contact surface 31) when the new data is acquired is the human finger F. Thus, the accuracy of determination of the human finger F can be further increased.

The acquisition target data includes data related to dimensions (for example, the dimensions L11, L12, L13, L21, L22, L23, L31, L32, and L33) of the contact region between the contact surface (contact surface 31) and an external object in a first direction (the first direction Dx) and a second direction (the second direction Dy) that are orthogonal to each other. With this data, it is possible to determine whether the spread tendency of contact area when a human presses the finger F against the contact surface is observed also at the acquisition of the new data described above. Thus, the accuracy of determination of the human finger F can be further increased.

The acquisition target data includes density data related to the size of a contact portion in which a contact of an external object is detected in the contact region between the contact surface (contact surface 31) and an external object relative to the size of a non-contact portion in which no contact of the external object is detected in the contact region. With this, it is possible to determine whether the tendency of density at each timing corresponds to that of the human finger F. Thus, the accuracy of determination of the human finger F can be further increased.

The force detector (force detector 30) individually detects force in each of a plurality of partial regions included in the contact surface (contact surface 31). The partial regions are, for example, the partial regions PA expressed by combinations of x and y coordinates described with reference to FIG. 7. The pattern detector (pattern detector 20) has a detection resolution at which a fingerprint concavity and convexity pattern can be detected in each partial region. For example, FIG. 7 schematically illustrates, with dashed lines, a detection resolution obtained by further partitioning each partial region PA. Comparison between the density data indicated by the reference data acquired at the aforementioned timings and the density data indicated by the new data acquired at the timings is performed for each partial region. Thus, the accuracy of determination of the human finger F can be further increased.

The force detector individually detects force in each of a plurality of partial regions included in the contact surface (contact surface 31). The partial regions are, for example, the partial regions PA expressed by combinations of x and y coordinates described with reference to FIG. 7. The acquisition target data includes data related to the magnitude of the force detected in each partial region. The acquisition target data is, for example, the force characteristic data and the authentication force distribution data described above. With this, it is possible to determine whether the tendency of force distribution acquired at each of the timings described above corresponds to that of the human finger F. Thus, the accuracy of determination of the human finger F can be further increased.

The pattern detector (pattern detector 20) detects the position of an external object on the contact surface (contact surface 31) based on capacitance. Thus, the fingerprint FP can be more accurately detected.

The pattern detector (pattern detector 20) detects the position of an external object on the contact surface (contact surface 31) based on mutual capacitance between facing electrodes (a drive electrode COML and a touch detection electrodes TDL) or self-capacitance of each electrode. Thus, the fingerprint FP can be more accurately detected.

The pattern detector (pattern detector 20) is integrated with a display panel configured to display an image, and thus it is more likely to reduce the thickness of the device 100 in the third direction Dz.

Figure 23:
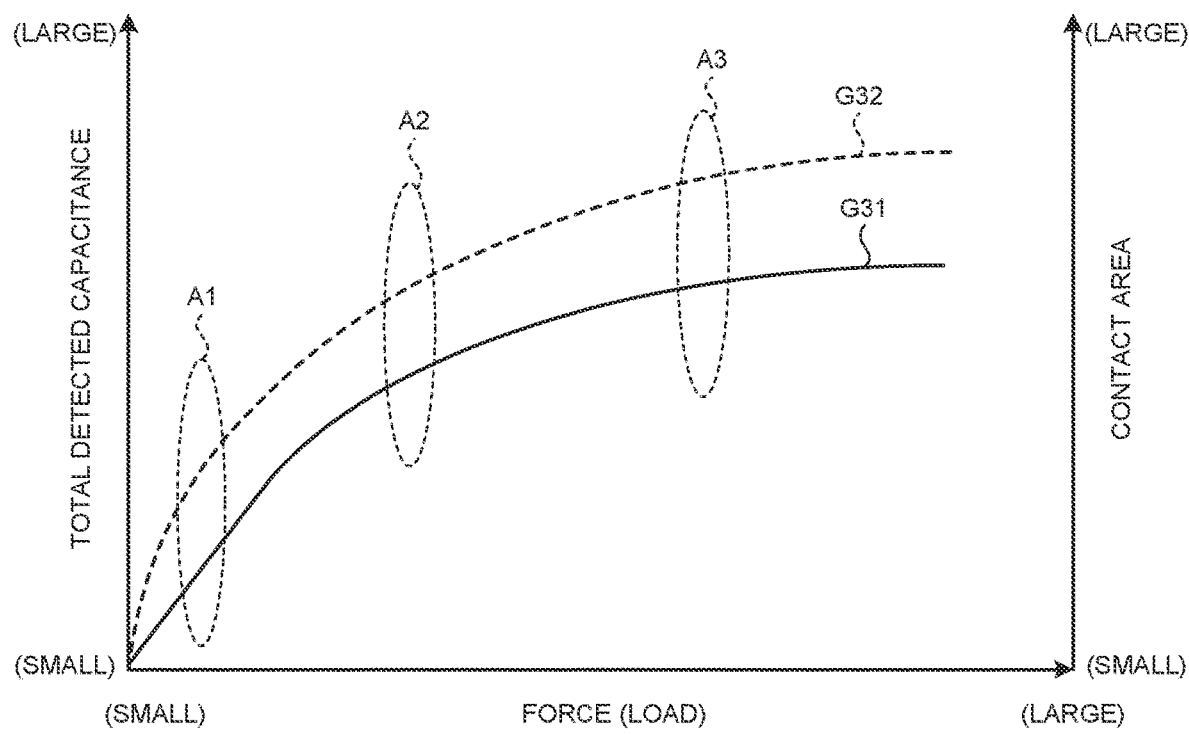
FIG. 23 is a graph illustrating an exemplary relation between both of signal strength (capacitance) and an area dimension (or area) detected by the pattern detector and the magnitude of force.

FIG. 23 is a graph illustrating an exemplary relation between both of signal strength (capacitance) and an area dimension (or area) detected by the pattern detector 20 and the magnitude of force. The above description is made on the mechanism of determining whether the contacting object is the finger F or a finger model based on the change patterns of the first dimension, the second dimension, and the third dimension in the first authentication processing, but the method of determining whether it is the finger F or a finger model based on dimensions is not limited thereto. For example, truth determination of the finger F may be performed based on the relation between signal strength (capacitance) and area dimensions (or area) detected by the pattern detector 20. A graph G31 in FIG. 23 illustrates the relation between the sum of signal strength (capacitance) detected by the pattern detector 20 when touch detection data is obtained and the magnitude of force. A graph G32 in FIG. 23 illustrates the relation between the dimensions (or area) of a fingerprint image when touch detection data is obtained and the magnitude of force. The correspondence relation of each of the signal strength (capacitance) and the area dimensions (or area) with respect to the magnitude of force is different between the finger F and a finger model.

The correspondence relation between signal strength (capacitance) and area dimensions (or area) obtained when a force of substantially A1 is applied, the correspondence relation between signal strength (capacitance) and area dimensions (or area) obtained when a force of substantially A2 is applied, and the correspondence relation between signal strength (capacitance) and area dimensions (or area) obtained when a force of substantially A3 is applied, are stored as data (reference data) for truth determination of the finger F in the characteristic data holder 45 in advance. The controller 40 (for example, the distribution calculator 43) derives data (comparison data) indicating the correspondence relation between signal strength (capacitance) and area dimensions (or area) obtained when a force of substantially A1 is applied, the correspondence relation between signal strength (capacitance) and area dimensions (or area) obtained when a force of substantially A2 is applied, and the correspondence relation between signal strength (capacitance) and area dimensions (or area) obtained when a force of substantially A3 is applied based on the temporary data obtained when the finger F (or finger model) is pressed against the detection device 10 at authentication processing. Then, the comparator 46 may compare the reference data and the comparison data, and the authenticator 48 may determine whether an object pressed against the detection device 10 in authentication processing is the finger F or a finger model based on the degree of identity or similarity between the reference data and the comparison data. The determination may be performed in place of the first authentication processing or may be added as processing performed by the falsification determiner 47.

The pattern detector 20 and the force detector 30 may be integrated with a display panel configured to display an image.

Figure 24:
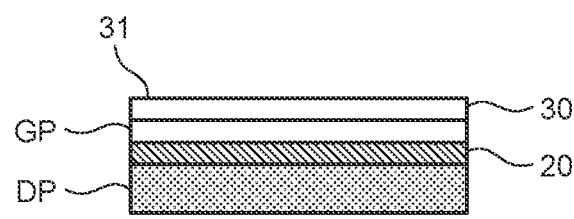
FIG. 24 is a schematic diagram illustrating a configuration in which the pattern detector, the force detector, and a display panel configured to display an image are integrated.

FIG. 24 is a schematic diagram illustrating a configuration in which the pattern detector 20, the force detector 30, and a display panel DP configured to display an image are integrated. FIG. 24 illustrates an example of a display-integrated configuration formed by stacking the force detector 30, a light-transmitting substrate GP, the pattern detector 20, and the display panel DP in the stated order from the contact surface 31 side toward a back surface side thereof. The light-transmitting substrate GP is, for example, a glass substrate but not limited thereto and may be formed of any other material.

The controller 40 may further have a function to check that a fingerprint image indicated by the touch detection data detected by the pattern detector 20 changes (expands) along with temporal change or force change (increase) while maintaining continuity without extreme difference.

The above embodiment describes data acquisition processing to be performed at different timings such as acquisition of the touch detection data that is performed at a timing when the first force is detected, at a timing when the second force is detected, and at a timing when the third force is detected. When the data acquisition to be performed at a plurality of timings, has failed once or more for some reason, the controller 40 may provide a notification that prompts to press a finger against the detection region SA again to perform data reacquisition. The notification is performed by, for example, displaying character strings on the display panel integrated with the pattern detector 20.

In FIGS. 2 and 3, the dimensions L11, L12, and L13 are dimensions along the first direction Dx, and the dimensions L21, L22, L23, L31, L32, and L33 are dimensions along the second direction Dy. The relation of such various dimensions with directions defined for the detection region SA may be fixed in advance or may be changeable. For example, the angle difference between the orientation of the finger F at characteristic data acquisition and the orientation of the finger F at acquisition of the contact region MA3 may be calculated based on the positional relation between characteristic points of the fingerprint FP or the like, and the relation between the various dimensions and directions may be matched based on the angle difference.

In the above-described embodiment, the first authentication processing, the second authentication processing, and the third authentication processing are performed, but at least one of the first authentication processing, the second authentication processing, and the third authentication processing may be performed. In the above-described embodiment, data acquisition is performed at three timings with the first force, the second force, and the third force, like data acquisition of the contact regions MA1, MA2, and MA3, for example, but the number of data acquisition timings is not limited to three and may be two or may be equal to or larger than four.

It should be understood that, among other effects achieved by aspects described in the embodiment, those clear from the present specification description or those that could be thought of by the skilled person in the art as appropriate are achieved by the present disclosure.

What is claimed is:

1. A detection device comprising:
a pattern detector having a contact surface that allows an external object to make contact therewith and configured to detect a concavity and convexity pattern of a fingerprint when a human finger is pressed against the contact surface;
a force detector configured to detect force applied to the contact surface; and
a controller configured to perform user authentication processing based on the pattern detected by the pattern detector and the force detected by the force detector,
wherein
the controller is configured to
store in advance, reference data obtained by acquiring, at each of a plurality of timings when a human finger is pressed against the contact surface, acquisition target data including data related to the pattern detected by the pattern detector, data related to the force detected by the force detector, or both data,
acquire new data including the acquisition target data acquired at each of a plurality of timings when an external object is newly pressed against the contact surface, and
determine whether the object pressed against the contact surface when the new data is acquired is a human finger based on difference between the acquisition target data indicated by the reference data at the timings and the acquisition target data indicated by the new data at the timings, the timings are two timings or more that are included in a pressing operation period from start to end of pressing of an external object against the contact surface, and the force detected by the force detector is different between the timings, each of the timings is a timing when predetermined force is detected by the force detector, and when the difference is in a predetermined error range, the controller determines that an object pressed against the contact surface when the new data is acquired is a human finger.

2. A detection device comprising:

a pattern detector having a contact surface that allows an external object to make contact therewith and configured to detect a concavity and convexity pattern of a fingerprint when a human finger is pressed against the contact surface;

a force detector configured to detect force applied to the contact surface; and a controller configured to perform user authentication processing based on the pattern detected by the pattern detector and the force detected by the force detector, wherein the controller is configured to store in advance, reference data obtained by acquiring, at each of a plurality of timings when a human finger is pressed against the contact surface, acquisition target data including data related to the pattern detected by the pattern detector, data related to the force detected by the force detector, or both data, acquire new data including the acquisition target data acquired at each of a plurality of timings when an external object is newly pressed against the contact surface, and determine whether the object pressed against the contact surface when the new data is acquired is a human finger based on difference between the acquisition target data indicated by the reference data at the timings and the acquisition target data indicated by the new data at the timings, the timings are two timings or more that are included in a pressing operation period from start to end of pressing of an external object against the contact surface, and the force detected by the force detector is different between the timings, and the acquisition target data includes data related to dimensions of a contact region between the contact surface and an external object in a first direction and a second direction that are orthogonal to each other.

3. A detection device comprising:

a pattern detector having a contact surface that allows an external object to make contact therewith and configured to detect a concavity and convexity pattern of a fingerprint when a human finger is pressed against the contact surface;

a force detector configured to detect force applied to the contact surface; and a controller configured to perform user authentication processing based on the pattern detected by the pattern detector and the force detected by the force detector, wherein the controller is configured to store in advance, reference data obtained by acquiring, at each of a plurality of timings when a human finger is pressed against the contact surface, acquisition target data including data related to the pattern detected by the pattern detector, data related to the force detected by the force detector, or both data, acquire new data including the acquisition target data acquired at each of a plurality of timings when an external object is newly pressed against the contact surface, and determine whether the object pressed against the contact surface when the new data is acquired is a human finger based on difference between the acquisition target data indicated by the reference data at the timings and the acquisition target data indicated by the new data at the timings, the timings are two timings or more that are included in a pressing operation period from start to end of pressing of an external object against the contact surface, and the force detected by the force detector is different between the timings, and the acquisition target data includes density data related to the size of a contact portion in which a contact of an external object is detected in a contact region between the contact surface and the external object relative to the size of a non-contact portion in which no contact of the external object is detected in the contact region.

4. The detection device according to claim 3, wherein the force detector individually detects force in each of a plurality of partial regions included in the contact surface, the pattern detector has a detection resolution at which a fingerprint concavity and convexity pattern can be detected in each of the partial regions, and comparison between the density data indicated by the reference data acquired at the timings and the density data indicated by the new data acquired at the timings is performed for each of the partial regions.

5. The detection device according to claim 1, wherein the force detector individually detects force in each of a plurality of partial regions included in the contact surface, and the acquisition target data includes data related to the magnitude of the force detected in each of the partial regions.

6. The detection device according to claim 1, wherein the pattern detector detects a position of an external object on the contact surface based on capacitance.

7. The detection device according to claim 5, wherein the pattern detector detects the position of an external object on the contact surface based on mutual capacitance between facing electrodes or self-capacitance of each electrode.

8. The detection device according to claim 5, wherein the pattern detector is integrated with a display panel configured to display an image.

9. The detection device according to claim 1, wherein the force detector individually detects force in each of a plurality of partial regions included in the contact surface, and the acquisition target data includes data related to the magnitude of the force detected in each of the partial regions.

10. The detection device according to claim 1, wherein the pattern detector detects a position of an external object on the contact surface based on capacitance.

11. The detection device according to claim 10, wherein the pattern detector detects the position of an external object on the contact surface based on mutual capacitance between facing electrodes or self-capacitance of each electrode.

12. The detection device according to claim 10, wherein the pattern detector is integrated with a display panel configured to display an image.

13. The detection device according to claim 2, wherein
the force detector individually detects force in each of a
plurality of partial regions included in the contact
surface, and
the acquisition target data includes data related to the
magnitude of the force detected in each of the partial
regions.

14. The detection device according to claim 2, wherein the pattern detector detects a position of an external object on the contact surface based on capacitance.

15. The detection device according to claim 14, wherein the pattern detector detects the position of an external object on the contact surface based on mutual capacitance between facing electrodes or self-capacitance of each electrode.

16. The detection device according to claim 14, wherein the pattern detector is integrated with a display panel configured to display an image.

\* \* \* \* \*